United States Patent
Li et al.

(10) Patent No.: US 9,497,054 B1
(45) Date of Patent: Nov. 15, 2016

(54) ELECTRONIC DEVICES HAVING INTERCONNECT RADIATION MITIGATION CAPABILITIES

(71) Applicant: Apple Inc., Cupertino, CA (US)

(72) Inventors: Tianqi Li, San Jose, CA (US); Cheung-Wei Lam, San Jose, CA (US); Vaneet Pathak, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/829,418

(22) Filed: Aug. 18, 2015

(51) Int. Cl.
| | | |
|---|---|---|
| *H04B 1/38* | (2015.01) | |
| *H04L 27/20* | (2006.01) | |
| *H04B 1/04* | (2006.01) | |

(52) U.S. Cl.
CPC ............. *H04L 27/20* (2013.01); *H04B 1/0475* (2013.01)

(58) Field of Classification Search
CPC .......... H04B 1/40; H04B 3/23; H04B 1/403; H04B 1/30; H04B 1/28; H04L 27/2601; H04L 1/0025; H04L 1/0003; H04L 1/0071; H04L 5/0007; H04L 1/0009; H04L 27/0008; H04L 27/2647; H04L 1/20; H04N 5/4401
USPC ........................................ 375/219, 295, 316
See application file for complete search history.

(56) References Cited

U.S. PATENT DOCUMENTS

| | | | |
|---|---|---|---|
| 7,611,358 B2 | 11/2009 | Cox et al. | |
| 8,258,892 B2 | 9/2012 | Abhari et al. | |
| 9,077,435 B1 | 7/2015 | Rada et al. | |
| 2014/0091874 A1* | 4/2014 | Cook | H03H 7/01 333/12 |
| 2014/0273860 A1* | 9/2014 | Hsu | H04L 25/08 455/63.1 |
| 2014/0320371 A1 | 10/2014 | Iso et al. | |
| 2015/0056860 A1 | 2/2015 | Hofmeister et al. | |

\* cited by examiner

*Primary Examiner* — Zewdu Kassa
(74) *Attorney, Agent, or Firm* — Treyz Law Group, P.C.; Michael H. Lyons

(57) ABSTRACT

Electronic devices may include unshielded connectors that convey radio-frequency signals with external devices. A first electronic device may include transmitter circuitry that transmits radio-frequency signals to phase shifting circuitry. The phase shifting circuitry may pass the radio-frequency signals to a first conductive contact of a connector on the first device, may generate modified signals by applying a phase shift of approximately 180 degrees to the radio-frequency signals, and may provide the modified signals to a second conductive contact on the connector. To mitigate undesirable resonance and radiation at the connector, the connector may concurrently convey the radio-frequency signals and the modified signals to an external device over the first and second contacts while mating contacts on a connector of the external electronic device are in electrical contact with the first and second conductive contacts.

20 Claims, 11 Drawing Sheets

ELECTRONIC DEVICES HAVING INTERCONNECT RADIATION MITIGATION CAPABILITIES

BACKGROUND

This relates generally to electronic devices, and, more particularly, to electronic devices with interconnects for communicating with other electronic devices.

Electronic devices often include communications circuitry for transmitting radio-frequency signals to external electronic devices over conductive (wired) paths. A typical electronic device might include a radio-frequency connector coupled to the communications circuitry that mounts to a radio-frequency connector on an external electronic device. The radio-frequency signals are conveyed to the external electronic device over the radio-frequency connectors.

In some scenarios, the radio-frequency connectors on the electronic device and the external electronic device are linked using a coaxial cable. A coaxial cable includes a signal conductor that conveys the radio-frequency signals and a ground conductor that completely surrounds the signal conductor. The ground conductor serves to convey ground signals between the devices while shielding any electromagnetic energy radiated at the signal conductor. However, interconnect structures having shielding layers can be unnecessarily bulky when the distance between radio-frequency connectors is relatively small and can be detrimental to the aesthetic appearance of the electronic devices.

In other scenarios, the space occupied by the radio-frequency interconnect is reduced by forming a ground conductor that conveys ground signals between the devices without shielding the corresponding signal conductor. However, an unshielded signal conductor linking the devices can leak or radiate signal power into the ambient surroundings of the devices, can be susceptible to ambient noise, can induce undesirable electromagnetic radiation on components of the devices, and can render data transmitted over the signal conductor insecure. It would therefore be desirable to be able to provide electronic devices with improved radio-frequency interconnect capabilities.

SUMMARY

Electronic devices may include unshielded connectors. The connectors may be used for conveying radio-frequency data signals to and from external electronic devices when the external electronic devices are coupled to the connector. The electronic devices may include radiation mitigation circuitry. The radiation mitigation circuitry may use phase shifting circuitry or other circuits for reducing the radiation of electromagnetic energy from the connectors.

For example, a first electronic device may include transceiver circuitry and a conductive connector. The conductive connector may include a number of contacts that mate with corresponding mating contacts on a mating connector of an external device. The transceiver circuitry may transmit radio-frequency signals (e.g., radio-frequency data signals) to phase shifting circuitry. The phase shifting circuitry may pass the radio-frequency data signals to a first conductive contact on the connector without adjusting a phase of the radio-frequency data signals. The phase shifting circuitry may generate modified (e.g., phase-shifted) radio-frequency data signals by applying a phase shift of approximately 180 degrees to the radio-frequency data signals. The phase shifting circuitry may provide the modified radio-frequency data signals to a second conductive contact on the connector.

The connector may concurrently convey the radio-frequency data signals and the phase-shifted data signals to the mating contacts on the external electronic device over the first and second contacts, respectively.

If desired, the connector may include a pair of power and ground contacts. For example, the connector may include a third conductive contact and a fourth conductive contact. The third conductive contact may convey a direct current (DC) power voltage between a power terminal on the electronic device and the external electronic device. The fourth conductive contact may convey a ground voltage between a ground terminal on the electronic device and the external electronic device while the mating contacts of the external electronic device connector are in conductive contact with the connector on the electronic device. In another suitable arrangement, the power supply terminal may be coupled to the first conductive contact via a first low pass filter. The ground terminal may be coupled to the second conductive contact via a second low pass filter circuit (e.g., for filtering out radio-frequency signals while passing direct current ground or power voltages). If desired, the phase shifting circuitry may be coupled to the first and second conductive contacts via respective high pass filter circuits (e.g., for blocking direct current power and ground voltages while passing radio-frequency signals). Additional phase shifting circuitry may be formed on the external electronic device that provides additional radio-frequency data signals and additional phase shifted radio-frequency data signals to the electronic device over the radio-frequency connectors.

By concurrently conveying radio-frequency data signals and a phase shifted copy of the radio-frequency data signals over respective first and second contacts on the unshielded connector, undesirable signal leakage and radiation at the unshielded connector may be significantly mitigated (e.g., because the leaking fields generated by the two signals and established between the two devices are canceled out). By forming the connectors without electromagnetic shielding, the space occupied by the connectors may be reduced while improving the aesthetic appearance of the connector structures and of the corresponding system of linked devices.

DETAILED DESCRIPTION

Electronic components such as electronic devices and other equipment may be interconnected using conductive (wired) paths. As an example, a cable or other conductive interconnect structures may include conductors that convey power signals, ground signals, and data signals between two interconnected electronic devices. Conductive interconnect structures may, for example, convey power between a power adapter and a portable electronic device, may convey data between a first device and a second device such as between a laptop computer and a peripheral device such as a mouse or keyboard, between a laptop computer and a cellular telephone, between two laptop computers, between a laptop computer and a portable hard drive device, etc. The conductive interconnect structures may, for example, include connector structures on a first electronic device and connector structures on a second electronic device that is linked with the first electronic device. The connector structures on each device may include conductive contacts (e.g., contact pads or pins) that are placed into contact to form one or more electrically conductive paths between the electronic devices over which data signals and other signals may be conveyed.

Figure 1:
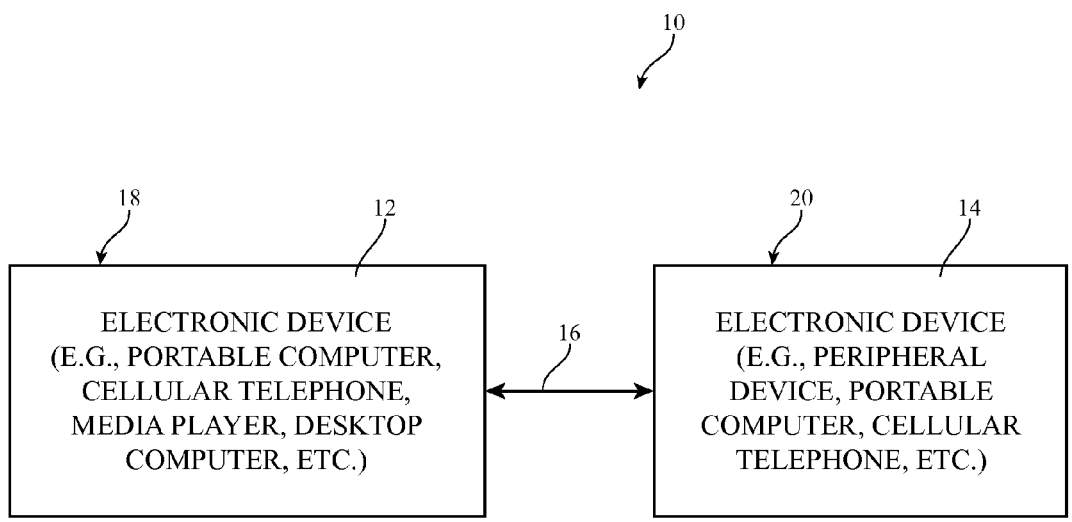
FIG. 1 is a diagram of two illustrative electronic devices that are conductively linked using a conductive radio-frequency interconnect and that may include interconnect radiation mitigation circuitry in accordance with an embodiment.

An illustrative system in which two electronic devices are interconnected using a conductive path is shown in FIG. 1. As shown in FIG. 1, a system 10 of interconnected devices may include a first electronic device 12 coupled to a second electronic device 14 via conductive path 16. Conductive path 16 may include one or more wired interconnect paths between first device 12 and second device 14 over which data signals, power signals, ground signals, and/or any other desired signals are conveyed. For example, first electronic device 12 may generate signals and transmit the signals to second electronic device 14 over conductive path 16 (e.g., over one or more conductive lines in path 16). If desired, second electronic device 14 may generate signals and transmit the signals to first electronic device 12 over path 16. Conductive path 16 may include connector structures on first device 12 and/or second device 14 that are placed into contact to form conductive interconnect path 16. Conductive path 16 may include any desired number of discrete conductive lines (e.g., wired paths) between device 12 and device 14. For example, there may be two, three, four, five, six, or more than six separate conductive lines included in conductive interconnect 16.

First electronic device 12 may be any desired electronic device having wireless and/or wired communications capabilities for transmitting and/or receiving data signals with a second, external electronic device such as second electronic device 14. First electronic device 12 may be, for example, a desktop or portable computer, laptop computer, tablet computer, cellular telephone, portable television, audio receiver, portable media player, power adapter device, portable hard drive device, integrated circuit package device, portable gaming device, or any other desired electronic equipment. First electronic device 12 may be provided in the form of stand-alone equipment (e.g., a handheld device that is carried in the pocket of a user) or may be provided as an embedded system (e.g., a system embedded within a larger system such as an automotive system, a building, or other larger computing device).

Second electronic device 14 may be any desired device having communications capabilities that works in conjunction with first electronic device 12 (e.g., that transmits and/or receives data signals over a conductive path with an external electronic device such as first device 12). Examples of electronic device 14 include a portable electronic device, a desktop or portable computer, laptop computer, tablet computer, cellular telephone, portable television, audio receiver, portable media player, portable hard drive device, integrated circuit package device, portable gaming device, power adapter device, or any other desired electronic equipment. In one suitable arrangement that is sometimes described herein as an example, second device 14 may be a peripheral electronic device that interfaces with first electronic device 12 such as an input-output device (e.g., a mouse, keyboard, docking structure, camera device, microphone device, fingerprint sensor device, touch pad, display device, alert device, lighting device, sound emitting device, audio device, scanner device, touch screen device, printer device, track pad, scroll wheel, joystick, key pad, gaming pad, sensor device, button-based device, or any other desired input-output device) or any other device that provides data signals to and/or receives data signals from first device 12 for operation in conjunction with the operations of first device 12. First electronic device 12 may therefore sometimes be referred to herein as primary electronic device 12 or primary device 12 whereas second electronic device 14 is sometimes referred to herein as peripheral electronic device 14, peripheral device 14, secondary device 14, or secondary electronic device 14.

First electronic device 12 may, if desired, include a number of electronic components arranged on one or more substrates such as one or more printed circuit boards or integrated circuits arranged within an electronic device housing 18. Second electronic device 14 may, if desired, include a number of electronic components arranged on one or more substrates such as one or more printed circuit boards or integrated circuits arranged within an electronic device housing 20. Housings 18 and 20 may include dielectric housing structures (e.g., plastic or polymer based structures), conductive housing structures (e.g., metal housing structures such as stainless steel, aluminum, etc.), ceramic housing structures, glass housing structures, fiber composite housing structures, other suitable materials, or a combination of two or more of these materials. Housings 18 and 20 may be formed using a unibody configuration in which some or all of housing 18/20 is machined or molded as a single structure or can be formed using multiple structures (e.g., an internal frame structure, one or more structures that form exterior housing surfaces, etc.).

Electronic devices interconnected using conductive (wired) interconnect structures such as first and second devices 12 and 14 often convey signals at high frequencies such as radio-frequency signals over conductive interconnect paths 16. Conveying data at radio-frequencies may allow for the transmitted data to have a greater bandwidth than when the data is transmitted at lower frequencies. For example, first device 12 may transmit radio-frequency signals to peripheral device 14 at a frequency of 5.5 GHz, 2.4 GHz, both 5.5 GHz and 2.4 GHz, or at any other desired radio frequency or combinations of radio-frequencies. Conductive interconnect structures over which radio-frequency signals are conveyed may sometimes be referred to herein as radio-frequency interconnect structures. Transmitting signals at radio-frequencies may cause unshielded signal lines over which the signals are conveyed to be susceptible to leakage of the signals into the ambient environment.

Figure 2:
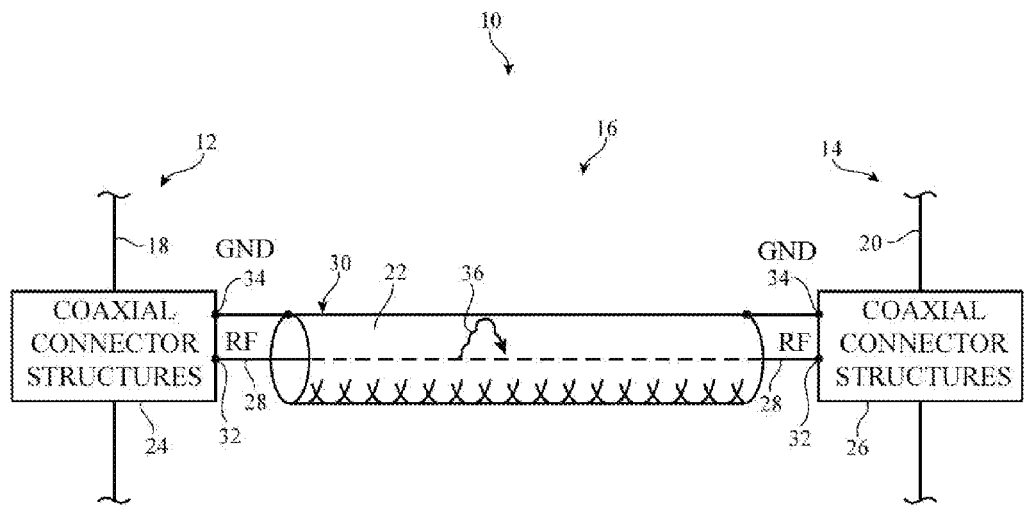
FIG. 2 is a diagram of a shielded interconnect that can be used in forming a radio-frequency link between electronic devices in accordance with an embodiment.

In some scenarios, radio-frequency interconnect structures such as structures 16 may include shielded connector structures that block leakage of signals into the ambient environment such as coaxial cable structures or other radio-frequency cabling. FIG. 2 shows an example of a coaxial cable structure that may be used to form conductive interconnect path 16. As shown in FIG. 2, coaxial cable 22 may be coupled between first device 12 and second device 14 for conveying radio-frequency signals between the devices. First device 12 may include coaxial cable connector structure 24 mounted to housing 18 for interfacing with coaxial cable 22. Second device 14 may include coaxial cable connector structure 26 mounted to housing 18 for interfacing with cable 22. Coaxial cable 22 may include an inner signal conductor 28 coupled between signal terminal 32 on coaxial connectors 24 and 26 and an outer ground conductor 30 wrapped completely around signal conductor 28. Ground conductor 30 may be coupled between ground terminals 34 on coaxial connectors 24 and 26. Signal conductor 28 may be used to convey radio-frequency data signals between signal terminals 32.

When conveying radio-frequency data signals, signal conductor 28 may leak radio-frequency energy away from signal conductor 28. As shown in FIG. 2, coaxial ground conductor 30 is wrapped completely around signal conductor 28 along its length. Coaxial ground conductor 30 may serve as a radio-frequency shield for radio-frequency signals conveyed on signal line 28 that blocks radio-frequency signals radiated from signal conductor 28 from reaching the surrounding environment (as shown by path 36). Similarly, ground shield 30 may prevent ambient radiation (e.g., radio-frequency energy or other ambient noise) from interfering with the signals conveyed on shielded signal line 28. The schematic example of FIG. 2 shows that coaxial shield 30 is shorted to connectors 24 and 26 at a single point 34 for the sake of clarity. In practice, coaxial shield 30 is shorted to connectors 24 and 26 for an entirety of the 360 degrees around signal conductor 28.

While coaxial cable 22 allows radio-frequency interconnection 16 to convey radio-frequency signals between devices 12 and 14 without leaking radio-frequency energy onto signal conductor 28 or leaking radio-frequency energy from conductor 28 into the ambient environment, shielded interconnects such as coaxial cable 22 are often difficult to implement in scenarios where the distance between devices 12 and 14 is relatively small (e.g., a few centimeters or fewer). For example, cables such as coaxial cable 22 can limit the minimum distance between devices 12 and 14 required to form conductive interconnect 16 and typically occupy an undesirably large amount of space in system 10.

Figure 3:
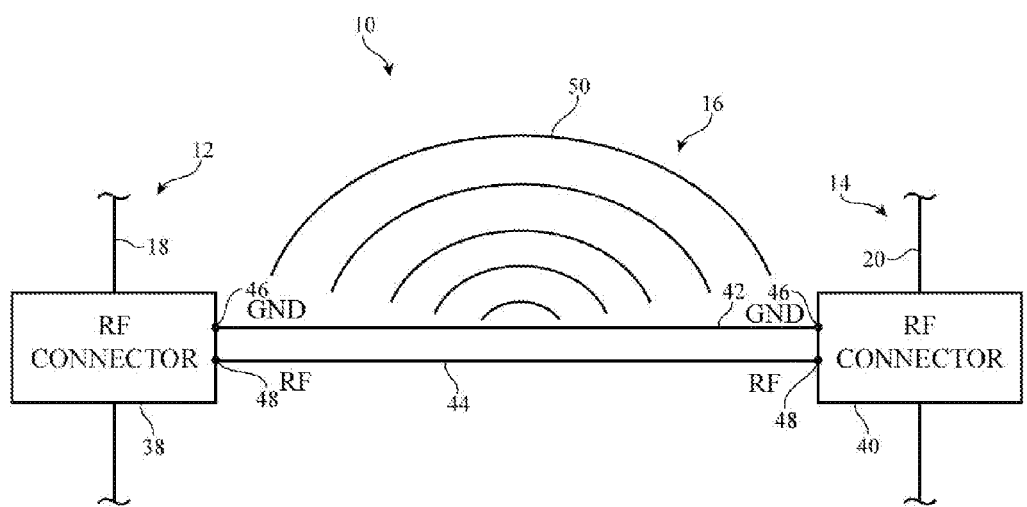
FIG. 3 is a diagram of an unshielded interconnect that can be used in forming a radio-frequency link between electronic devices in accordance with an embodiment.

If desired, wired interconnect 16 may be formed without a shielding layer such as shielding layer 30 of coaxial cable 22 to reduce the space consumed by interconnect 16 and to improve the aesthetic appearance of system 10. As shown in FIG. 3, first device 12 may include radio-frequency connector structure 38 mounted to housing 18 and second device 14 may include radio-frequency connector structure 40 mounted to housing 20. Conductive signal path 42 may be coupled between RF signal terminals 46 on connectors 38 and 40 and may convey a radio-frequency signal between devices 12 and 14. Conductive ground path 44 may be coupled between ground terminals 48 on connectors 38 and 40 and may convey ground signals GND (e.g., a DC ground voltage) between devices 12 and 14. Conductors 42 and 44 may be formed from any desired un-shielded conductive structures such as copper wires or contacts. While unshielded lines 42 and 44 occupy less space and are more aesthetically attractive than coaxial structures 22 of FIG. 2, unshielded structures 42 and 44 can leak radio-frequency energy while conveying radio-frequency signals such that radio-frequency energy 50 is emitted or leaked in the space between devices 12 and 14 (i.e., at interconnect 16). Leaked radio-frequency energy 50 may give rise to undesirable electromagnetic compatibility concerns in system 10, such as generation of electromagnetic interference with other electronic components such as antenna structures or other sensitive components on device 12 and/or 14 or interference with other electronic devices external to interconnected system 10. Such interference can deteriorate wireless performance of first device 12, second device 14, and other devices in the vicinity of linked system 10. In addition, leaked radio-frequency energy 50 may drive one or more metal portions of devices 12 and 14 (e.g., metal portions of housings 18 and 20) or nearby metal objects external to system 10 to radiate and receive ambient radio-frequency signals, further deteriorating wireless performance of system 10 and of electronic devices in its vicinity. It may therefore be desirable to be able to provide devices 12 and 14 in system 10 with improved radio-frequency interconnect capabilities that mitigate radiation such as radiation 50 along interconnect 16 without utilizing bulky and aesthetically unattractive interconnect shielding structures.

Figure 4:
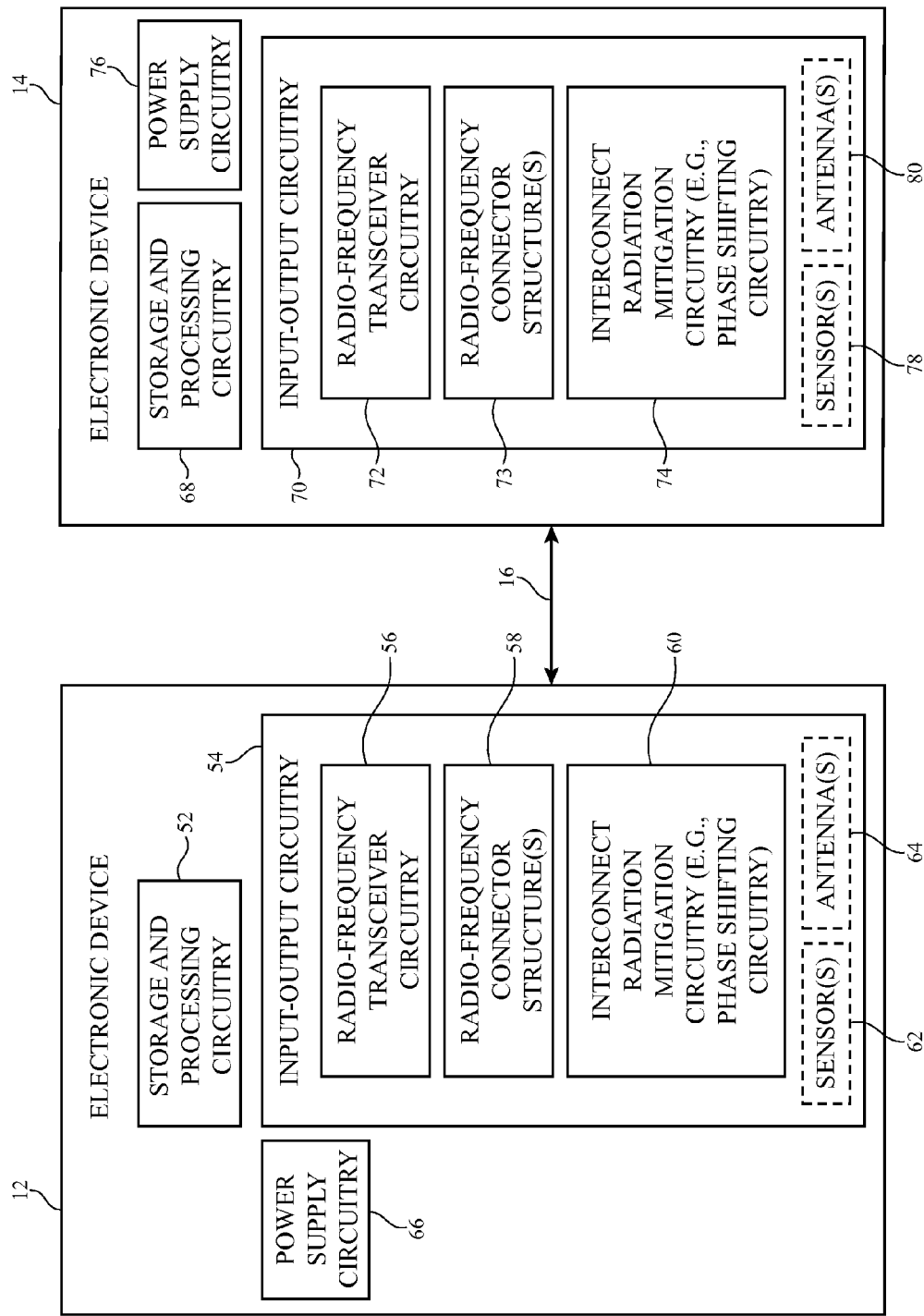
FIG. 4 is a schematic diagram showing how two electronic devices linked together using an unshielded conductive radio-frequency interconnect may include interconnect radiation mitigation circuitry for mitigating signal leakage at the interconnect in accordance with an embodiment.

If desired, first electronic device 12 and/or second electronic device 14 may include interconnect resonance mitigation circuitry for mitigating leakage of electromagnetic energy at conductive path 16 without forming electromagnetic shielding structures at path 16. FIG. 4 is an illustrative schematic diagram of electronic devices 12 and 14 having interconnect radiation mitigation circuitry. As shown in FIG. 4, first electronic device 12 may include control circuitry such as storage and processing circuitry 52 for supporting the operation of device 12. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in circuitry 52 may be used to control the operation of device 12. The processing circuitry may be based on one or more microprocessors, microcontrollers, digital signal processors, baseband processors, power management units, audio chips, application specific integrated circuits, etc.

Storage and processing circuitry 52 may be used to run software on device 10, such as internet browsing applications, voice-over-internet-protocol (VOIP) telephone call applications, email applications, media playback applications, operating system functions, functions related to communications band selection during radio-frequency transmission and reception operations, etc. To support interactions with external equipment, storage and processing circuitry 52 may be used in implementing communications protocols. Communications protocols that may be implemented using storage and processing circuitry 28 include internet protocols, wired radio-frequency data transfer protocols, universal serial bus (USB) protocols, universal asynchronous receiver/transmitter (UART) protocols, wireless local area network protocols (e.g., IEEE 802.11 protocols—sometimes referred to as WiFi®), protocols for other short-range wireless communications links such as the Bluetooth® protocol, cellular telephone protocols, MIMO (multiple input multiple output) protocols, antenna diversity protocols, etc.

First device 12 may include input-output circuitry such as input-output devices 54. Input-output devices 54 may be used to allow data to be supplied to first device 12 and to allow data to be provided from first device 12 to external devices such as second electronic device 14. Input-output devices 54 may include buttons, joysticks, scrolling wheels, touch pads, key pads, keyboards, microphones, speakers, tone generators, vibrators, cameras, sensors, light-emitting diodes and other status indicators, displays, touch screens, data ports, etc. A user can control the operation of first device 12 by supplying commands through input-output devices 54 and may receive status information and other output from first device 12 using the output resources of input-output devices 54.

As shown in FIG. 4, input-output devices 54 may include radio-frequency transceiver circuitry 56 for communicating with external equipment such as second device 14. Radio-frequency transceiver circuitry 56 may be formed from one or more integrated circuits, power amplifier circuitry, mixing circuitry, baseband circuitry, receiver circuitry, transmitter circuitry, filtering circuitry, low-noise input amplifiers, passive radio-frequency (RF) components, transmission line structures, and other circuitry for handling radio-frequency wired and/or wireless signals. Radio-frequency transceiver circuitry 56 may generate and convey radio-frequency signals to radio-frequency connector structures 58 and may receive radio-frequency signals from external devices via radio-frequency connector structures 58. Radio-frequency connector structures 58 may be electrically and/or mechanically coupled to second device 14 via conductive interconnect paths 16. Radio-frequency connector structures 58 may convey radio-frequency data signals generated at radio-frequency transceiver circuitry 56 to second device 14 via conductive interconnect 16 and may convey radio-frequency signals received over conductive interconnect 16 to radio-frequency transceiver circuitry 46. Conductive interconnect 16 may be an unshielded interconnect to reduce the overall space occupied by interconnect 16 and connectors 58 and 73.

In order to mitigate radiation or leakage of electromagnetic energy at unshielded interconnect 16, input-output devices 54 may include interconnect radiation mitigation circuitry 60. If desired, radiation mitigation circuitry 60 may be interposed between radio-frequency transceiver circuitry 56 and radio-frequency connector 58. In another suitable arrangement, circuitry 60 may be integrated into transceiver circuitry 56. Interconnect radiation mitigation circuitry 60 may modify radio-frequency data signals transmitted by radio-frequency transceiver 56 prior to conveying the modified radio-frequency data signals to connector 58 for mitigating radiation of energy on path 16 despite path 16 being provided without an electromagnetic shielding structure. If desired, mitigation circuitry 60 may include one or more phase shifting circuits that apply a phase shift to the radio-frequency data signals received from radio-frequency transceiver circuitry 56. Mitigation circuitry 60 may, if desired, provide a phase shift to the radio-frequency data signals within the frequency band of the radio-frequency data signals (e.g., without providing any phase shift to the radio-frequency signals at other frequencies).

If desired, input-output devices 54 may include optional sensor circuitry 62 and optional antenna circuitry 64. Sensor circuitry 62 may include capacitive sensor structures, inductive sensor structures, proximity sensor structures, phase and magnitude sensor structures, power sensor structures, or any other desired sensor structures for sensing conditions of the surroundings of first device 12. Antennas 64 may be used for establishing wireless links to other devices such as second device 14, a cellular base station, a wireless access point, etc.

First electronic device 12 may include power supply circuitry such as power supply circuitry 66. Power supply circuitry 66 may be used to power input-output devices 54 and processing circuitry 52. If desired, power supply circuitry 66 may convey power signals to second electronic device 14 via path 16 to power one or more portions of device 14.

Second electronic device 14 coupled to first device 12 may include storage and processing circuitry 68 for controlling operations of second device 14. Second device 14 may include input-output circuitry 70 having radio-frequency transceiver circuitry 72 coupled to conductive interconnect path 16 via radio-frequency connector structures 73. If desired, second device 14 may include interconnect radiation mitigation circuitry such as phase shifting circuitry 74 for applying phase shifts to data signals provided to first electronic device 12. Components on second device 14 may be powered using power supply circuitry 76 and/or using power signals received from first device 12. If desired, second device 14 may include optional sensors 78 for gathering information about the surroundings of second device 14 and optional antennas 80 for establishing wireless links with other devices such as first device 12.

The example of FIG. 4 is merely illustrative. If desired, second electronic device 14 may be formed without one or more of control circuitry 68, power supply circuitry 76, sensors 78, and antennas 80. In scenarios where second electronic device 14 does not transmit radio-frequency signals to first electronic device 12 (e.g., in a unidirectional communications scheme in which only first electronic device 12 conveys radio-frequency signals to second electronic device 14 over conductive interconnect path 16), interconnect resonance mitigation circuitry 74 may be omitted from second device 14. Radio-frequency transceiver circuits 56 and 72 may include one or more radio-frequency transmitters, radio-frequency receivers, or both radio-frequency transmitters and receivers (e.g., transceiver circuitry that both transmits and receives radio-frequency signals).

Figure 5:
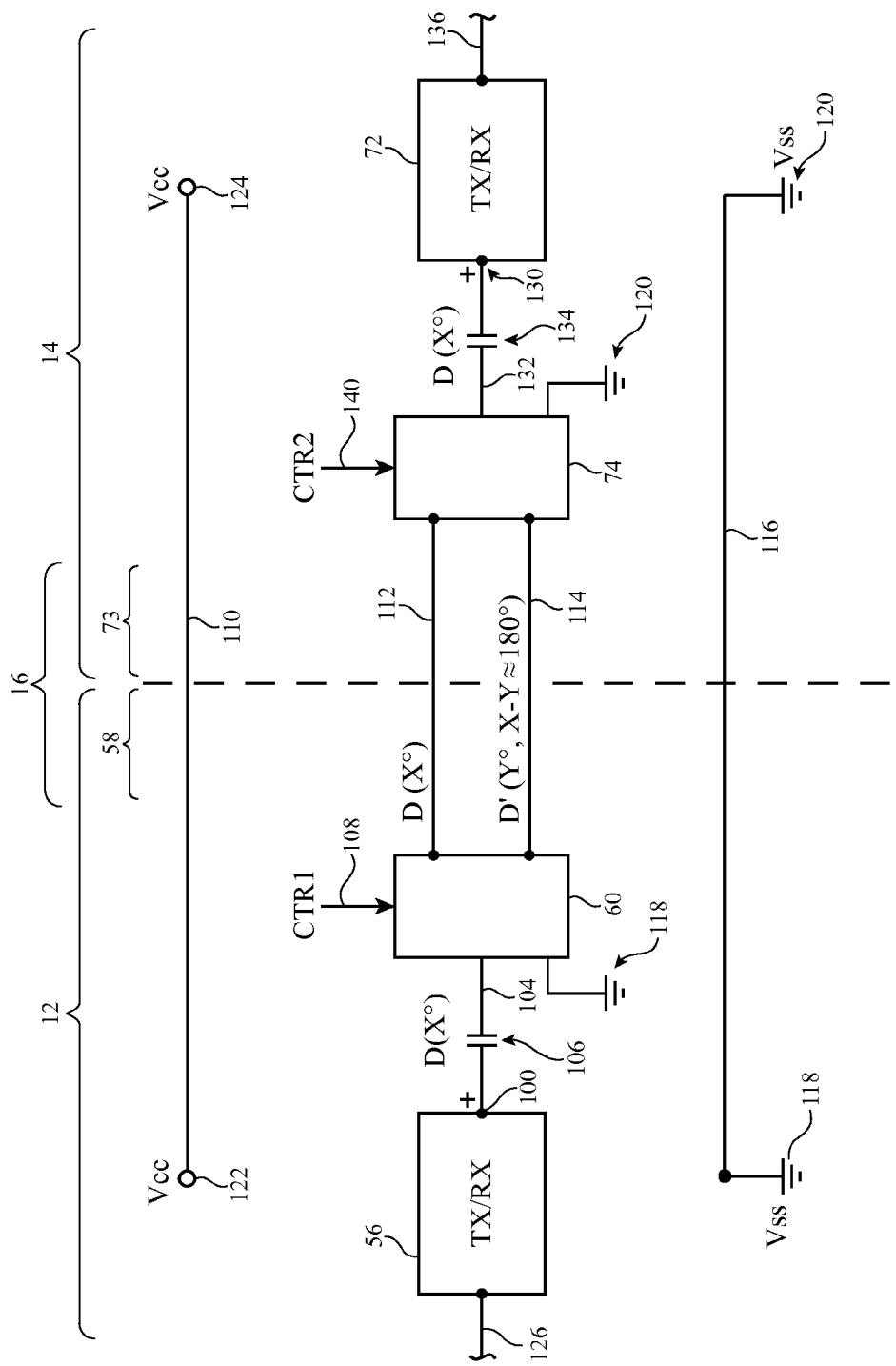
FIG. 5 is a circuit block diagram showing illustrative circuitry that may generate phase shifted complementary radio-frequency signals for transmission over an unshielded conductive interconnect to mitigate signal leakage at the interconnect in accordance with an embodiment.

FIG. 5 is an illustrative circuit block diagram showing how first electronic device 12 may interface with second electronic device 14 via unshielded conductive interconnect path 16 while mitigating radiation of radio-frequency energy at path 16. As shown in FIG. 5, first device 12 may be coupled to second device 14 via wired radio-frequency interconnect 16 (e.g., an interconnect formed without any shielding structures). Interconnect 16 may include portions formed on one or both of devices 12 and 14. For example, interconnect 16 may include radio-frequency connector structures 58 formed on first device 12 placed into electrical contact with radio-frequency connector structures 73 formed on second device 14. Radio-frequency connector structures 58 and 73 may be electrically coupled together using any desired electrical contacts such as conductive contact pins or contact pads (not shown for the sake of clarity). If desired, additional radio-frequency connector structures such as cabling or additional wiring may be formed between connector structures 58 and 73.

As shown in the example of FIG. 5, unshielded radio-frequency interconnect 16 may include four conductive paths (lines) coupled between first device 12 and second device 14. For example, radio-frequency interconnect 16 may include a first path 110 that conveys powering signals such as a power voltage Vcc between first device 12 and second device 14 (sometimes referred to herein as powering path 110 or power line 110). Power path 110 may be coupled between powering terminal 122 on first device 12 and powering terminal 124 on second device 14. Powering terminal 122 may be coupled to a voltage source such as power supply circuitry 66 of first device 12 whereas powering terminal 124 may be coupled to a voltage source such as power supply circuitry 66 of second device 14 (FIG. 4). If desired, first device 12 may provide powering voltage Vcc to power one or more electronic components on second device 14 and/or second device 14 may provide powering voltage Vcc to power one or more electronic components on first device 12. Powering voltage Vcc may be a direct current (DC) or an alternating current (AC) supply voltage.

Interconnect structures 16 may include a second path 112 and a third path 114 that convey radio-frequency data signals between devices 12 and 14. A fourth path 116 may be included in interconnect 16 for conveying ground level signals such as ground voltage Vss between devices 12 and 14 (e.g., for electrically coupling ground terminal 118 on device 12 to ground terminal 120 on device 14). Ground terminals 118 and 120 may be coupled to any desired ground level voltage source on devices 12 and 14, to ground terminals on transceivers 52 and 73, or other structures such as metal portions of housings 18 and 20. Radio-frequency connector structures 58 and 73 may each include four conductive lines and four corresponding conductive contacts for implementing wired paths 110, 112, 114, and 116 of interconnect 16.

First electronic device 12 may include radio-frequency transceiver (TX/RX) circuitry 56 that receives data signals for transmission via input line 126. For example, transceiver circuitry 56 may receive data for transmission to second device 14 from storage and processing circuitry 52, baseband processing circuitry, or any other desired communications circuitry via path 126. Radio-frequency transceiver circuitry 56 may generate radio-frequency data signals D (sometimes referred to herein as radio-frequency data D, data D, or data signals D) based on the data received over input 126 and may output radio-frequency data signals D at signal (positive) terminal 100 for transmission to second device 14. Transceiver circuitry 56 may include mixing circuitry, data conversion circuitry (e.g., analog-to-digital and/or digital-to-analog convert circuitry), amplifier circuitry, filtering circuitry, or any other desired circuitry for converting baseband data or other data signals received over path 126 into radio-frequency data signals D. Radio-frequency data signals D may be output from signal terminal 100 at a signal phase of X° (e.g., zero degrees, ten degrees, forty-five degrees, or any other desired signal phase).

Signal terminal 100 of transceiver 56 may be coupled to a terminal of interconnect radiation mitigation circuitry 60 via path 104. Mitigation circuitry 60 may have a first terminal coupled to first data path 112 (e.g., to a portion of radio-frequency connector structure 58 used to implement a portion of first data path 112), a second terminal coupled to second data path 114 (e.g., to a portion of radio-frequency connector structure 58 used to implement a portion of second data path 114), and, if desired, a terminal coupled to ground 118. If desired, one or more optional AC coupling capacitors 106 may be interposed on transceiver output line 104. Radiation mitigation circuitry 60 may receive radio-frequency data signals D from signal terminal 100 over path 104. Radiation mitigation circuitry 60 may pass received radio-frequency data signals D to first data line 112 without altering the phase of data signals D (e.g., data signals D may be output on first data line 112 at the phase X° with which transceiver 56 outputs data signals D). Data signals D may be conveyed to second device 14 over path 112 at phase X°.

Radiation mitigation circuitry 60 may include phase shifting circuitry (sometimes referred to as phase shifter circuitry, phase adjustment circuitry, electromagnetic energy leakage mitigation circuitry, or phase adjusting circuitry) that is configured to generate modified radio-frequency data signals D' by performing a phase shift operation on the radio-frequency data signal D received from transceiver 56 (e.g., on a copy of the radio-frequency data D received from transceiver 56) so that modified data signals D' are approximately 180° out of phase with data signals D (e.g., shifting circuitry 60 may provide an approximately 180° phase shift to data D to generate modified data D' having a phase of Y°). Radiation mitigation circuitry 60 may output modified radio-frequency data signals D' on second data line 114. Modified data signals D' having phase Y° may be conveyed to second device 14 over path 114 concurrently (e.g., simultaneously) with the transmission of corresponding data signals D having phase X° over path 112 (e.g., the data D' transmitted over path 114 may be identical to the data D transmitted over path 112 but shifted in phase with respect to data D by approximately 180°). Modified data signals D' may sometimes be referred to herein as phase shifted signals D', shifted data D', phase shifted data D', or modified data D', complementary data D', complementary signals D', or phase shifted data signals D'.

Phase shifting circuitry 60 may provide a predetermined phase shift to data signals D when generating modified data signals D' such that the difference between phases Y° and X° at the location of interconnect 16 is approximately 180° (e.g., phase shifter circuitry 60 may generate modified signals D' having a selected phase such that the absolute value of X−Y is between 170 and 190 degrees, between 175 and 185 degrees, exactly 180 degrees, between 179 and 181 degrees, or any other value that is approximately equal to 180 degrees). For example, when data signals D are received from transceiver 56 at phase X=0° phase shifting circuitry 60 may apply a phase shift of 180° to data signals D to generate modified (phase-shifted) data signals D' having phase Y=180°, when data signals D are received at phase X=60° phase shifting circuitry 60 may apply a phase shift of 180° to generate modified data signals D' having phase Y=240°, when data signals D are received at phase X=−180° phase shifting circuitry 60 may apply a phase shift of 180° to generate modified data signals D' having phase Y=0°, etc.

In this way, modified data signals D' are provided on unshielded conductive path 114 approximately 180° out of phase with the corresponding data signals D provided on unshielded conductive path 112. Because modified data signals D' are identical to but out of phase with data signals D, the modified data signals D' may interact with the electric field in the vicinity of interconnect 16 in a manner that is approximately equal and opposite to the interaction of data signals D with the electric field in the vicinity of interconnect 16. In other words, phase shifting circuitry 60 on first device 12 may intentionally introduce noise (e.g., a disruptive signal) in the form of modified data D' over unshielded interface 16 that is capable of disrupting or balancing out the electric field resonating modes established by the leaked power of data signals D at interface 16. In this way, the electromagnetic field effects of radio-frequency data signals D on unshielded interconnect 16 may be canceled out by the electrical effects of modified radio-frequency data signals D' such that any resonance or radiation at unshielded interconnect 16 is substantially eliminated, thereby preventing undesirable electromagnetic compatibility and interference effects due to the lack of radio-frequency shielding on interconnect 16.

In one suitable arrangement, interconnect radiation mitigation circuitry 60 may be configured to provide signals with the same phase shift of approximately 180° for all data signals transmitted by transceiver circuitry 56 (e.g., circuitry 60 may be hard-coded or hardwired to provide the same phase shift). In practice, the arrangement of connectors 58 and 73, local environment factors, or other perturbations generated by second device 14 may slightly perturb the difference between phases X° and Y° at the location of interconnect 16 such that it may be desirable to be able to adjust the phase shift provided by circuitry 60. If desired, interconnect radiation mitigation circuitry 60 may be dynamically adjusted to provide one of a number of different possible phase shifts during normal operation of system 10. For example, radiation mitigation circuitry 60 may receive control signals CTR1 over input path 108 (e.g., from storage and processing circuitry 52 or other control circuitry) that control phase shifting circuitry 60 to provide a selected one of many possible different phase shifts to data signals D. In this way, the phase shift provided by circuitry 60 may be dynamically adjusted in real time to ensure that phase X° is approximately 180° out of phase with phase Y° at the location of interconnect 16, even if the difference of phase X° and phase Y° at interconnect 16 is perturbed over time. If desired, control signals CTR1 may be provided based on data obtained by sensors 62 on first device 12 and/or sensors 78 on second device 14 (FIG. 4) that identifies when an adjustment to the phase shift provided by circuitry 60 is needed.

Interconnect radiation mitigation circuitry 60 may include any desired circuitry for generating phase-shifted data signals D' that are conveyed over path 114 in conjunction with data signals D on path 112. For example, interconnect resonance mitigation circuitry 60 may include balun circuitry, directional coupler circuitry, power divider circuitry in conjunction with a phase shifter, active circuitry such as an amplifier or inverter, combinations of these circuits, or any other desired phase shifting circuitry. Radiation mitigation circuitry 60 may be formed on a common substrate, integrated circuit, or printed circuit board as radio-frequency transceiver circuitry 56, may be integrated within radio-frequency transceiver circuitry 56, or may be formed on a discrete (dedicated) substrate, integrated circuit, or printed circuit board.

Second electronic device 14 may include interconnect radiation mitigation circuitry 74 having a first terminal coupled to first data path 112, a second terminal coupled to second data path 114, a third terminal coupled to signal (positive) terminal 130 of radio-frequency transceiver 72 via path 132, and, if desired, a terminal coupled to ground 120. If desired, optional AC coupling capacitor 134 may be interposed on path 132. Radiation mitigation circuitry 74 may receive data signals D having phase X° from first device 12 over path 112 and may receive phase-shifted data signals D' having phase Y° from first device 12 over path 114. Radiation mitigation circuitry 74 may pass data signals D to path 132 without modifying the phase of data signals D so that data signals D having phase X° are received at transceiver circuitry 72 (e.g., so that the original data signals as transmitted by transceiver 56 on first device 12 are received at transceiver circuitry 72 on second device 14). Radio-frequency transceiver circuitry 72 may down-convert the received radio-frequency data to extract the data that was received by transceiver 56 on first device 12 over path 126 and may pass the extracted data to storage and processing circuitry 68, baseband circuitry, or any other desired circuitry on second device 14 via path 136 for further processing. Mitigation circuitry 74 may short phase-adjusted data signals D' to ground, may pass phase-adjusted data signals D' to other circuitry on device 14, or may otherwise discard the phase adjusted data signals.

Similar to radio-frequency transceiver circuitry 56 on first device 12, radio-frequency transceiver circuitry 72 on second device 14 may receive data signals for transmission over input line 136. For example, transceiver circuitry 72 may receive data for transmission to first device 12 from storage and processing circuitry 68, baseband processing circuitry, or any other desired communications circuitry via path 136. Radio-frequency transceiver circuitry 72 may generate radio-frequency data signals D based on the data received over input 136 and may output radio-frequency data signals D at signal terminal 130 for transmission to first device 12. Transceiver circuitry 72 may include mixing circuitry, data conversion circuitry, amplifier circuitry, filtering circuitry, or any other desired circuitry for converting baseband data or other data signals received over path 136 into radio-frequency data signals D. Radio-frequency data signals D may be output from signal terminal 130 at signal phase X° and conveyed to interconnect resonance mitigation circuitry 74 via path 132. Radiation mitigation circuitry 74 may receive the radio-frequency data signals D from signal terminal 130 over path 132. Radiation mitigation circuitry 74 may pass received radio-frequency data signals D to first data line 112 without altering the phase of data signals D (e.g., data signals D may be output on first data line 112 at the phase X° with which transceiver 72 outputs data signals D). Data signals D may be conveyed to first device 12 over path 112 at phase X°.

Radiation mitigation circuitry 74 may include phase shifting circuitry that is configured to generate modified radio-frequency data signals D' by performing a phase shift operation on the radio-frequency data signal D received from transceiver 72. For example, phase shifting circuitry 74 may shift the phase of data signals D to generate modified data D' that is approximately 180° out of phase with data D (e.g., shifting circuitry 74 may provide an approximately 180° phase shift to data D to generate modified data D' having a phase of Y°). Radiation mitigation circuitry 74 may output modified radio-frequency data signals D' on second data line 114. Modified data signals D' having phase Y° may be conveyed to first device 12 over path 114 concurrently (e.g., simultaneously) with the transmission of corresponding data signals D having phase X°.

Phase shifting circuitry 74 may provide a predetermined phase shift to data signals D when generating modified data signals D' such that the difference between phases Y° and X° at interconnect 16 is approximately 180° (e.g., phase shifter circuitry 60 may generate modified signals D' having a selected phase such that the absolute value of X−Y is between 170 and 190 degrees, between 175 and 185 degrees, exactly 180 degrees, between 179 and 181 degrees, or any other value that is approximately equal to 180 degrees). In this way, modified data signals D' are provided on unshielded conductive path 114 approximately 180° out of phase with data signals D provided on unshielded conductive path 112. Because modified data signals D' are out of phase with data signals D, the modified data signals D' may interact with the electric field in the vicinity of interconnect 16 in a manner that is approximately equal and opposite to the interaction of data signals D with the electric field in the vicinity of interconnect 16.

In one suitable arrangement, interconnect radiation mitigation circuitry 74 may be configured to provide signals with the same phase shift of approximately 180° for all data signals transmitted by transceiver circuitry 72 (e.g., circuitry 74 may be hard-coded or hardwired to provide the same phase shift). In practice, the arrangement of connectors 58 and 73, local environment factors, or other perturbations generated by first device 12 may slightly perturb the difference between phases X° and Y° such that it may be desirable to be able to adjust the phase shift provided by circuitry 74. If desired, interconnect radiation mitigation circuitry 74 may be dynamically adjusted to provide one of a number of different phase shifts during normal operation of system 10. For example, radiation mitigation circuitry 74 may receive control signals CTR2 over input path 140 (e.g., from storage and processing circuitry 68 or other control circuitry) that control phase shifting circuitry 74 to provide a selected one of many possible phase shifts to data signals D. In this way, the phase shift provided by circuitry 74 may be dynamically adjusted in real time to ensure that phase X° is approximately 180° out of phase with phase Y° at the location of interconnect 16, even if the difference of phase X° and phase Y° at interconnect 16 is perturbed over time. If desired, control signals CTR2 may be provided based on data obtained by sensors 62 on first device 12 and/or sensors 78 on second device 14 (FIG. 4) that identifies when an adjustment to the phase shift provided by circuitry 74 is needed.

Interconnect radiation mitigation circuitry 74 may include any desired circuitry for generating phase-shifted data signals D' for conveying on path 114 in conjunction with conveying data signals D on path 112. For example, interconnect resonance mitigation circuitry 74 may include balun circuitry, directional coupler circuitry, power divider circuitry in conjunction with a phase shifter, active circuitry such as an inverter, combinations of these circuits, or any other desired phase shifting circuitry. Radiation mitigation circuitry 74 may be formed on a common substrate, integrated circuit, or printed circuit board as radio-frequency transceiver circuitry 72, may be integrated within radio-frequency transceiver circuitry 72, or may be formed on a discrete (dedicated) substrate, integrated circuit, or printed circuit board. Interconnect radiation mitigation circuitry 60 and 74 may sometimes be referred to herein as phase shifting circuitry, phase shift circuitry, phase shifter circuitry, phase adjustment circuitry, interconnect resonance mitigation circuitry, radiation mitigation circuitry, resonance mitigation circuitry, leakage mitigation circuitry, dynamic phase adjustment circuitry (e.g., in scenarios where the phase shift provided by circuitry 60/74 is adjustable), or dynamic phase shifting circuitry.

Radiation mitigation circuitry 60 on first device 12 may receive data signals D having phase X° from second device 14 over path 112 and may receive phase-shifted data signals D' having phase Y° from second device 14 over path 114. Radiation mitigation circuitry 74 may pass data signals D to path 104 without modifying the phase of data signals D so that data signals D having phase X° are received at transceiver circuitry 56 (e.g., so that the original data signals as transmitted by transceiver 72 on second device 14 are received at transceiver circuitry 56 on first device 12). Radio-frequency transceiver circuitry 56 may down-convert the received radio-frequency data to extract the data that was received by transceiver 72 on second device 14 over path 136 and may pass the extracted data to storage and processing circuitry 52, baseband circuitry, or any other desired circuitry on first device 12 via path 126. Mitigation circuitry 60 may short phase-adjusted data signals D' to ground, may pass phase-adjusted data signals D' to other circuitry on device 12, or may otherwise discard the phase adjusted data signals.

In the example of FIG. 5, interconnect 16 is a bi-directional conductive link between devices 12 and 14 such that radio-frequency data may be conveyed from device 12 to device 14 and from device 14 to device 12. This example is merely illustrative. If desired, interconnect 16 may be a unidirectional interconnect in which data is only ever conveyed from one of devices 12 and 14 to the other. In scenarios where interconnect 16 is a unidirectional interconnect, one of phase shifting circuits 60 and 74 may be omitted (e.g., in systems 10 where radio-frequency data is only ever conveyed from first device 12 to second device 14 and not from second device 14 to first device 12, second device 14 may be formed without phase shifting circuit 74, whereas in systems 10 where radio-frequency data is only ever conveyed from second device 14 to first device 12 and not from first device 12 to second device 14, first device 12 may be formed without phase shifting circuit 60). The example of FIG. 5 is merely illustrative. In general, circuitry 56 and 60 on first device 12 may be connected in any desired manner and circuitry 74 and 72 on second device 14 may be connected in any desired manner (e.g., intervening electronic components may be formed between these circuits, ground path 116 may pass through circuitry 60 and 74, ground path 116 may be coupled between ground terminals on transceivers 56 and 72, etc.).

Figure 6:
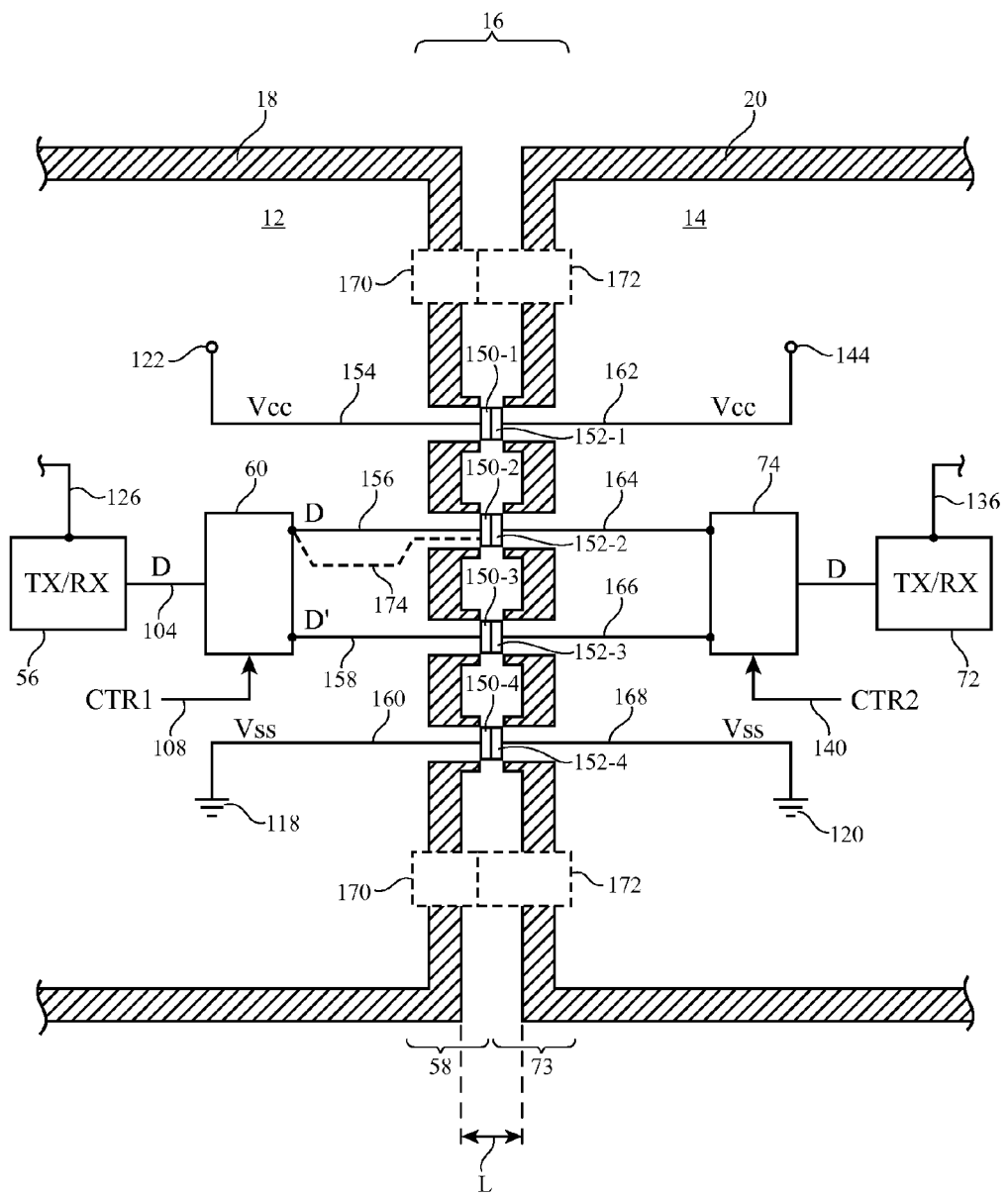
FIG. 6 is a diagram showing how illustrative radio-frequency connectors on first and second electronic devices may be placed into electrical contact while mitigating signal leakage at an interconnect between devices in accordance with an embodiment.

FIG. 6 is an illustrative diagram showing how first connector structures 58 on first device 12 may interface with second connector structures 73 on second device 14 to form conductive interconnect path 16. As shown in FIG. 6, connector structures 58 on first device 12 may be mounted to housing 18 of first device 12, whereas connector structures 73 on second device 14 may be mounted to housing 20 of second device 14. Connector structures 58 may serve as an electrical (conductive) interface between conductive lines internal to housing 18 and conductive structures external housing 18 whereas connector structures 73 may serve as a conductive interface between conductive lines internal to housing 20 and conductive structures external to housing 20. Connector structures 58 may be mounted to connector structures 73 (e.g., second device 14 may be mounted or otherwise placed into contact with first device 12 such that connector structures 58 are in conductive contact with connector structures 73) to establish conductive contact between first electronic device 12 and second electronic device 14 for conveying radio-frequency signals between the devices. In one suitable arrangement, connector structures 58 are removably mounted to connector structures 73 (e.g., so that second device 14 may be easily detached from first device 12 after radio-frequency data has been conveyed between the devices).

In the example of FIG. 6, connector structures 58 include four contact pads 150 that form a portion of the conductive paths of radio-frequency interconnect 16 (e.g., a first contact pad 150-1, a second contact pad 150-2, a third contact pad 150-3, and a fourth contact pad 150-4). Contact pads 150 may be coupled to electrical components within device 12 via corresponding conductive traces. For example, contact pad 150-1 may be coupled to power supply terminal 122 via conductive powering trace 154, contact pad 150-2 may be coupled to phase shifting circuitry 60 via conductive data trace 156, contact pad 150-3 may be coupled to shifting circuitry 60 via conductive data trace 158, and contact pad 150-4 may be coupled to ground terminal 118 via conductive grounding trace 160. Conductive traces 154, 156, 158, and 160 may be formed on different substrates or on one or more common substrates (e.g., on one or more printed circuit boards or other dielectric substrates within device 12). In another suitable arrangement, one or more of traces 154, 156, 158, and 160 may be formed from conductive wires, conductive connector structures, conductive vias structures, pogo pins, spring pins, solder structures, transmission line structures, or any other desired conductive structures within or on first device 12 for electrically coupling contact pads 150 to phase shifting circuitry 60 and terminals 122 and 118. Contact pads 150 may include any desired electrical contact structures such as conductive pin structures, flat conductive pad structures, conductive structures having a shape that mates with corresponding pads 152 on second device 14, or any other desired conductive structures. For example, contact pads 150 may protrude from housing 18 so that contact pads 150 are easily biased against corresponding contacts on second device 14 or so that contact pads 150 are inserted within a recessed portion of an external device such as a recess in housing 20 of second device 14. As another example, contact pads 150 may be formed within a recessed portion of housing 18 that receives corresponding protruding portions associated with connector 73 on second device 14. In scenarios where housing 18 is formed from metal, contact pads 150 may be insulated from the metal housing (e.g., by dielectric such as a dielectric support structure or dielectric coating).

Similarly, connector structures 73 on second device 14 may include four contact pads 152 that form a portion of the conductive paths of interconnect 16 (e.g., a first contact pad 152-1, a second contact pad 152-2, a third contact pad 152-3, and a fourth contact pad 152-4). Contact pads 152 may be coupled to electrical components within device 14 via corresponding conductive traces. For example, contact pad 152-1 may be coupled to power supply terminal 144 via conductive powering trace 162, contact pad 152-2 may be coupled to phase shifting circuitry 74 via conductive data trace 164, contact pad 150-3 may be coupled to shifting circuitry 74 via conductive data trace 166, and contact pad 150-4 may be coupled to ground terminal 120 via conductive grounding trace 168. Conductive traces 162, 164, 166, and 168 may be formed on different substrates or on one or more common substrates (e.g., on one or more printed circuit boards or other dielectric substrates within device 14). In another suitable arrangement, one or more of traces 162, 164, 166, and 168 may be formed from conductive wires, conductive connector structures, conductive via structures, pogo pins, spring pins, solder structures, transmission line structures, or any other desired conductive structures within device 12 for electrically coupling contact pads 152 to phase shifting circuitry 74 and terminals 144 and 120. Contact pads 152 may include any desired electrical contact structures such as conductive pin structures, flat conductive pad structures, conductive structures having a shape that mates with corresponding pads 150 on first device 12, or any other desired conductive structures. For example, contact pads 152 may protrude from housing 20 so that contact pads 150 are easily biased against corresponding contacts 150 on first device 12 or so that contact pads 152 are inserted within a recessed portion of an external device such as a recess in housing 18 of first device 12. As another example, contact pads 152 may be formed within a recessed portion of housing 20 that receives corresponding protruding portions associated with connector 58 on first device 12.

The conductive traces on first device 12, the conductive traces on second device 14, first contact structures 150, and second contact structures 152 may collectively form the conductive paths of radio-frequency interconnect 16. For example, conductive trace 154, conductive trace 162, contact 150-1, and contact 152-1 may collectively form conductive powering path 110 (e.g., as shown in FIG. 5), conductive trace 156, conductive trace 164, contact 150-2, and contact 152-2 may collectively form conductive data path 112, conductive trace 158, conductive trace 166, contact 150-3, and contact 152-3 may collectively form conductive phase shifted data path 114, and conductive trace 160, conductive trace 168, contact 150-4, and contact 152-4 may collectively form conductive ground path 116 (e.g., power voltage Vcc may be conveyed between power terminals 122 and 144 on devices 12 and 14 via traces 154 and 162 and contact pads 150-1 and 152-1, data signals D may be conveyed between phase shifting circuitry 60 and phase shifting circuitry 74 via traces 156 and 164 and contact pads 150-2 and 152-1, phase shifted data signals D' may be conveyed between phase shifting circuitry 60 and 74 via traces 158 and 166 and contact pads 150-3 and 152-3, and ground signals Vss may be conveyed between terminals 118 and 120 via traces 160 and 168 and contact pads 150-4 and 152-4).

If desired, portions of housing 18 may be in contact with portions of housing 20 when device 14 is mounted to device 12 at interconnect 16 or there may be a gap between portions of housing 18 and portions of housing 20. In general, there may be a distance L between housing 18 and housing 20 when device 14 is mounted to device 12 (e.g., a distance L equal to a few millimeters, 1 centimeter, between 1-10 centimeters, less than 1 centimeter, etc.). In scenarios where phase shifted data signals D' are not provided over contact pads 150-3 and 152-3, radio-frequency data signals D provided over contact pads 150-2 and 152-2 may leak electromagnetic power outwards and may induce radiation at interconnect 16 that interferes with one or more other components on devices 12 and 14 or separate from devices 12 and 14 (e.g., electromagnetic compatibility issues may arise such as scenarios in which portions of housings 18 and 20 are induced to radiate electromagnetic energy). By providing phase shifted data signals D' approximately 180° out of phase with radio-frequency data D over contact pads 150-3 and 152-3, the electromagnetic field contributions of radio-frequency data D may be effectively canceled out, thereby preventing radiation of energy outwards from the unshielded contact pads.

If desired, connector structures 58 on first device 12 may include optional connector alignment structures 170 mounted to housing 18 for aligning contact pads 150 with corresponding contact pads 152 on device 14. Alignment structures 170 may include, for example, one or more alignment protrusions (e.g., pins or other protrusions of housing 18 for mating with corresponding slot or notch structures in housing 20 of device 14), screws, magnets (e.g., for biasing first device 12 towards device second 14 at locations on housing 20 that include ferromagnetic materials or magnets), ferromagnetic structures (e.g., for biasing first device 12 towards second device 14 at locations on housing 20 that include magnets), alignment holes or grooves (e.g., notches, holes, or slots cut into housing 18 for aligning with corresponding protruding structures on second device 14), retractable alignment pins, adhesive, hooks (e.g., for hooking onto portions of housing 20), device support structures (e.g., for mechanically supporting some or all or of second device 14 or for ensuring that second device 14 is always at a predetermined distance from first device 12 when mounted to first device 12), or any other desired structures for ensuring or otherwise facilitating alignment of contact pads 150 with contact pads 152 when mounting first device 12 to second device 14). Alignment structures 170 may be formed on one side of contact pads 150, on two sides of contact pads 150, or may surround some or all of contact pads 150. Optional alignment structures 170 may, for example, facilitate alignment of contact pads 150 and 152 for a user who wishes to transfer radio-frequency data between devices 12 and 14 via interconnect 16 (e.g., so that the user need not focus their close attention on the alignment of pads 150 and 152 when mounting second device 14 to first device 12 to establish interconnect 16).

If desired, connector structures 73 on second device 14 may include optional connector alignment structures 172 mounted to housing 20 for aligning contact pads 152 with corresponding contact pads 150 on device 12. Alignment structures 172 may include, for example, one or more alignment protrusions (e.g., pins or other protrusions of housing 20 for mating with corresponding slot or notch structures in housing 18 of first device 12), screws, magnets (e.g., for biasing second device 14 towards first device 12 at locations on housing 18 that include ferromagnetic materials or magnets), ferromagnetic structures (e.g., for biasing second device 14 towards first device 12 at locations on housing 18 that include magnets), alignment holes or grooves (e.g., notches, holes, or slots cut into housing 20 for aligning with corresponding protruding structures on first device 12), retractable alignment pins, adhesive, device support structures (e.g., for mechanically supporting some or all of first device 12 or for ensuring that first device 12 is always at a predetermined distance from device 14 when mounted to device 14), or any other desired structures for ensuring or otherwise facilitating alignment of contact pads 150 with contact pads 152 when mounting device 14 to device 12). Alignment structures 172 may be formed on one side of contact pads 152, on two sides of contact pads 152, or may surround some or all of contact pads 152. Optional alignment structures 172 may, for example, facilitate alignment of contact pads 150 and 152 for a user who wishes to transfer radio-frequency data between devices 12 and 14 via interconnect 16. If desired, one, both, or neither of devices 12 and 14 may include corresponding connector alignment structures.

When conveying radio-frequency data between devices 12 and 14, phase shifting circuitry 60 may provide phase-shifted data signals D' at a suitable signal phase such that data signals D' are approximately out of phase with (e.g., approximately 180° out of phase with) data signals D. For example, if data signals D have a phase of zero degrees when provided on path 156, phase shifting circuitry 60 may provide modified data signals D' at a phase of 180 degrees. When data signals D reach contact pad 150-2 and phase shifted data signals D' reach contact pad 150-3, data signals D will still have a phase of zero degrees and data signals D' will still have a phase of 180 degrees. The electromagnetic contributions of modified data signals D' will thereby cancel out the electromagnetic contributions of data signals D at contact pads 150/152, thereby mitigating any potential radiation at contact pads 150/152. In this example, the path lengths of traces 156 and 158 are the same and any phase shift in the data signals due to the path length between circuitry 60 and contact pads 150 will be uniform for both data signals D and modified data signals D'. In other words, an additional phase shift generated for signals D by the path length of path 156 will be equal to an additional phase shift generated for signals D' by the path length of path 158 and signals D and D' will still be out of phase with respect to each other at contact pads 150.

However, in some scenarios, the path lengths of traces 156 and 158 may be different. For example, trace 156 may follow a meandering path when coupling phase shifting circuitry 60 to contact pad 150-2 such as that shown by dashed line 174 (e.g., a path having a different path length than trace 158). Because path 174 has a different path length than trace 158 between phase shifting circuitry 60 and the corresponding contact pad, the path length associated with trace 158 adds a phase shift to the modified data signals D' that is different from the phase shift added to data signals D by the path length associated with path 174. Phase shifting circuitry 60 may therefore provide modified data signals D' at a desired phase such that modified data signals D' are approximately 180 degrees out of phase with data signals D at the location of contact pads 150, even if this means that modified data signals D' need to be provided at a phase that is not 180 degrees out of phase with data signals D at the output of phase shifting circuitry 60.

For example, the path length of path 174 may add ten degrees of phase shift to data signals D whereas the path length of path 158 may add twenty-five degrees of phase shift to modified data signals D'. If data signals D are passed onto path 174 by phase shifting circuitry 60 at a phase of zero degrees and modified data signals D' are provided to path 174 by phase shifting circuitry 60 at a phase of 180 degrees, data signals D will be received at contact pad 150-2 at a phase of ten degrees whereas modified data signals D' will be received at contact pad 150-3 at a phase of 205 degrees (e.g., 195 degrees out of phase with data signals D). As the modified data signals are no longer approximately 180 degrees out of phase with data signals D in this scenario, radiation may still be undesirably induced at contacts 150. Phase shift circuitry 60 may thereby output modified data signals D' at a phase of 165 degrees so that modified data signals D' are received at contact pad 150-2 at a phase of 190 degrees, which is 180 degrees out of phase with the phase of data signals D at contact pad 150-1 (e.g., 10 degrees). Any potential radiation at contacts 150 may thereby be mitigated despite the differing path lengths of the conductive traces within device 12. In general, phase shift circuitry 60 may provide a modified data signals D' at a desired phase such that modified data signals D' are approximately 180 degrees out of phase with data signals D at the location of contact pads 150, regardless of the relative path lengths of conductive lines 156 and 158. If desired, the path lengths of traces 156 and 158 may be characterized during manufacture of device 12 such that phase shifting circuitry 60 is pre-programmed (e.g., in a manufacturing setting prior to use of device 12 by an end user) to provide modified data signals D' with a desired phase shift.

In scenarios where the path lengths of traces 156 and 158 are different, there may be a difference in signal magnitude between paths 156 and 158 at the location of contacts 150 (e.g., the signal magnitude of data D may be less than the signal magnitude of modified data D' at contacts 150 when trace 156 follows path 174). If desired, magnitude offset compensation circuitry may be interposed on one or both of traces 156 and 158. The magnitude offset compensation circuitry may compensate for signal magnitude variations between paths 156 and 158. For example, amplifier circuitry and/or attenuator circuitry may be interposed on traces 156 and 158. Amplifier circuitry may provide a gain to data signals D or modified data signals D' to increase the magnitude of those signals when received at contacts 150. Attenuator circuitry may attenuate data signals D or modified data signals D' to decrease the magnitude of those signals when received at contacts 150. The magnitude offset compensation circuitry may suitably reduce or increase the magnitude of one or both of signals D and D' so that the magnitudes are approximately equal at the location of contacts 150.

In the example of FIGS. 5 and 6, connectors 58 and 73 each include four conductive contacts for forming conductive interconnect 16 (e.g., so that each connector handles a respective one of a ground voltage, a power voltage, a radio-frequency data signal, and a phase shifted radio-frequency data signal required between first device 12 and second device 14 without radiating electromagnetic energy at the interconnect). In general, a greater number of conductive contacts can increase the relative size of connector structures 58 and 73 and reduce the aesthetic appeal of devices 12 and 14. If desired, connectors 58 and 73 may be formed using two conductive contacts instead of four conductive contacts to reduce the relative sizes of connectors 58 and 73 (e.g., thereby freeing up additional space on devices 12 and 14 for forming other components such as a display or additional connector structures and thereby improving the aesthetic appearance of devices 12 and 14 relative to scenarios in which more than two contacts are used). The two conductive contacts may be used to each convey two of the ground voltage, power voltage, radio-frequency data signal, and phase shifted radio-frequency data signal between devices 12 and 14.

Figure 7:
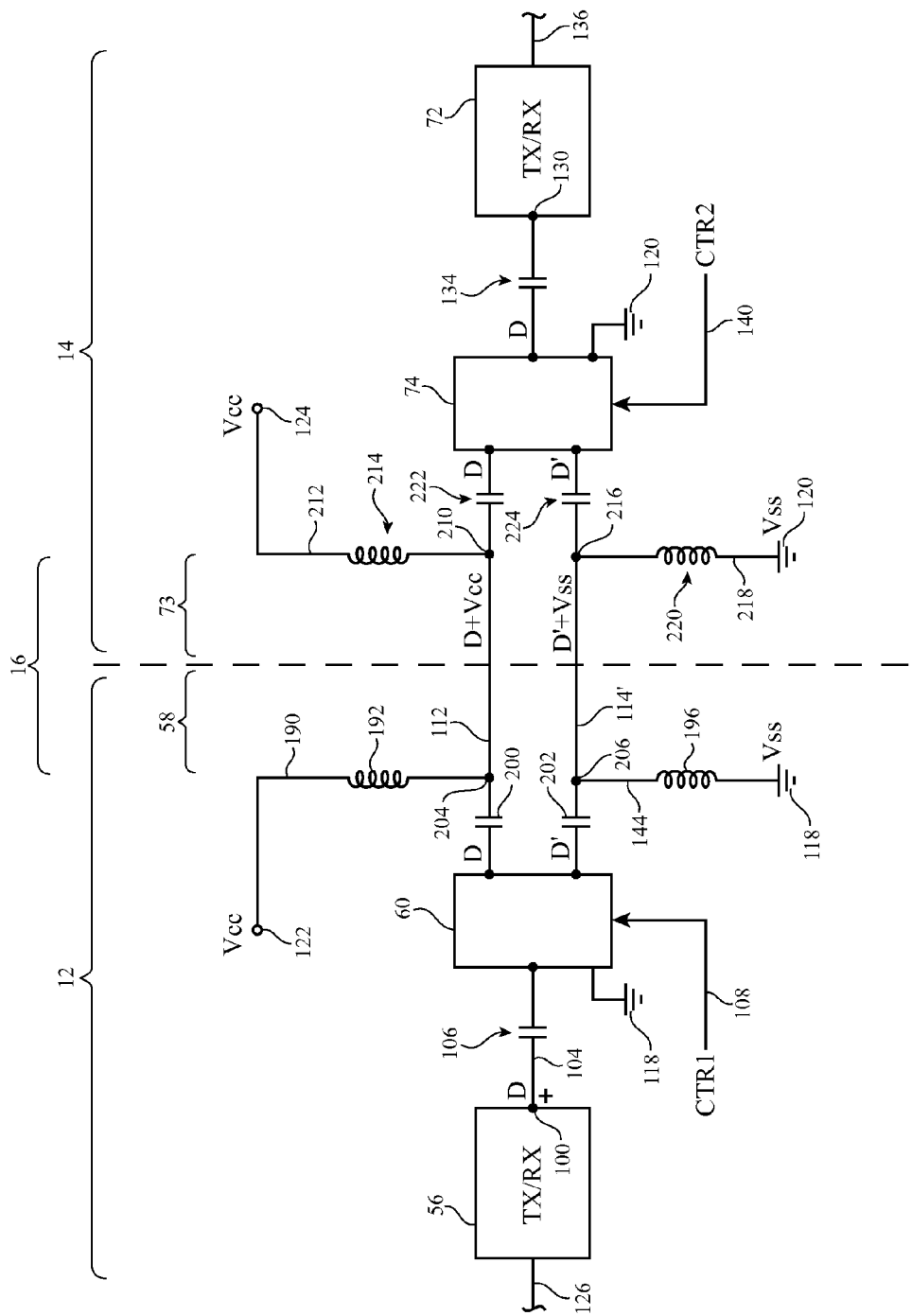
FIG. 7 is a circuit block diagram showing illustrative circuitry that may multiplex power and ground signals onto radio-frequency data lines for reducing the total size of the radio-frequency interconnect required to convey signals between the first and second devices in accordance with an embodiment.

FIG. 7 is an illustrative circuit block diagram showing how first electronic device 12 and second electronic device 14 may multiplex power and ground voltages onto the conductive paths used to convey data signal D and modified data signal D' (e.g., to reduce the number of conductive contacts included in conductive interconnect 16 relative to scenarios where ground and power voltages are provided with respective conductive paths on interconnect 16).

As shown in FIG. 7, power terminal 122 on first device 12 may be coupled to node 204 on data path 112 via conductive path 190 and ground terminal 118 may be coupled to node 206 on phase shifted data path 114 via conductive path 194.

Device 12 may include low pass filtering circuitry 192 interposed on path 190 between power terminal 122 and data path 112 and low pass filtering circuitry 196 interposed on path 194 between ground terminal 118 and phase shifted data path 114. In the example of FIG. 7, filtering circuitry 192 and 196 include inductors interposed on paths 190 and 194 respectively. In general, filtering circuitry 192 and 196 may include any desired low pass filter circuitry that allows low frequency signals to pass while blocking high frequency signals (e.g., filtering circuitry 192 and 196 may include any desired networks of one or more inductors, capacitors, and/or resistors connected in any desired manner).

Filtering circuit 192 may pass relatively low frequency signals such as power signal Vcc (e.g., a DC power voltage or other relatively low frequency AC voltage signal) onto path 112 and/or onto terminal 122 (e.g., in scenarios where power signal Vcc is received from second device 14) while blocking relatively high frequency signals (e.g., radio-frequency signals) such as radio-frequency data signals D from passing onto powering terminal 122. Filtering circuit 196 may pass relatively low frequency signals such as ground voltage Vss (e.g., a DC ground signal) onto path 114 and/or onto node 118 while blocking relatively high frequency (e.g., radio-frequency signals) such as modified radio-frequency data signals D' from passing onto ground terminal 118.

If desired, first device 12 may include high pass filtering circuitry interposed on paths 112 and 114 between phase shifting circuitry 60 and nodes 204 and 202 (e.g., a first filtering circuit 200 may be interposed on data line 112 between phase shifting circuit 60 and node 204 whereas a second filtering circuit 202 may be interposed on phase shifted data line 114 between phase shifting circuit 60 and node 206). In the example of FIG. 7, filtering circuitry 200 and 202 include capacitors interposed on paths 112 and 114 respectively. In general, filtering circuitry 200 and 202 may include any desired high pass filter circuitry that allows high frequency signals to pass while blocking low frequency signals (e.g., filtering circuits 200 and 202 may include any desired networks of one or more inductors, capacitors, and/or resisters connected in any desired manner).

Filtering circuit 200 may pass relatively high frequency signals (e.g., radio-frequency signals) such as radio-frequency data signals D onto path 112 and/or onto phase shifting circuitry 60 while blocking relatively low frequency signals such as power voltage Vcc from passing to phase shifting circuitry 60. Filtering circuit 202 may pass relatively high frequency signals such as phase shifted radio-frequency data signals D' onto path 114 and/or onto phase shifting circuitry 60 (e.g., in scenarios where device 12 received data signals D' from device 14) while blocking relatively low frequency signals such as ground level voltage Vss from passing to phase shifting circuitry 60. Radio-frequency data signals D and power signals such as power voltage Vcc may be conveyed to second device 14 over path 112 whereas phase shifted radio-frequency data signals D' and ground voltage Vss may be passed to second device 14 over path 114. In this way, ground voltage Vss and phase shifted data signals D' may be frequency multiplexed onto path 114 and power voltage Vcc and data signals D may be frequency multiplexed onto path 112 without the need for dedicated lines to convey power voltage Vcc and ground voltage Vss.

Power terminal 124 on second device 14 may be coupled to node 210 on data path 112 via conductive path 212 and ground terminal 120 on second device 14 may be coupled to node 216 on phase shifted data path 114 via conductive path 218. Device 14 may include low pass filtering circuitry 214 interposed on path 212 between power terminal 124 and data path 112 and low pass filtering circuitry 220 interposed on path 218 between ground terminal 120 and phase shifted data path 114. In the example of FIG. 7, filtering circuitry 214 and 220 include inductors interposed on paths 212 and 218 respectively. In general, filtering circuitry 214 and 220 may include any desired low pass filter circuitry that allows low frequency signals to pass while blocking high frequency signals (e.g., filtering circuitry 214 and 220 may include any desired networks of one or more inductors, capacitors, and/or resistors connected in any desired manner).

Filtering circuit 214 may pass relatively low frequency signals such as power signal Vcc (e.g., a DC power voltage or other relatively low frequency AC voltage signal) onto path 112 and/or onto terminal 124 (e.g., in scenarios where power signals Vcc are received from first device 12) while blocking relatively high frequency signals (e.g., radio-frequency signals) such as radio-frequency data signals D from passing onto powering terminal 124. Filtering circuit 220 may pass relatively low frequency signals such as ground voltage Vss (e.g., a DC ground signal) onto path 114 and/or onto node 120 while blocking relatively high frequency (e.g., radio-frequency signals) such as modified radio-frequency data signals D' from passing onto ground terminal 120.

If desired, second device 14 may include high pass filtering circuitry interposed on paths 112 and 114 between phase shifting circuitry 74 and nodes 210 and 216 (e.g., a first filtering circuit 222 may be interposed on data line 112 between phase shifting circuit 74 and node 210 whereas second filtering circuit 224 may be interposed on phase shifted data line 114 between phase shifting circuit 74 and node 216). In the example of FIG. 7, filtering circuits 222 and 224 include capacitors interposed on paths 112 and 114 respectively. In general, filtering circuitry 222 and 224 may include any desired high pass filter circuitry that allows high frequency signals to pass while blocking low frequency signals (e.g., filtering circuits 222 and 224 may include any desired networks of one or more inductors, capacitors, and/or resisters connected in any desired manner).

Filtering circuit 222 may pass relatively high frequency signals (e.g., radio-frequency signals) such as radio-frequency data signals D onto path 112 and/or onto phase shifting circuitry 74 while blocking relatively low frequency signals such as power voltage Vcc from passing to phase shifting circuitry 74. Filtering circuit 224 may pass relatively high frequency signals such as phase shifted radio-frequency data signals D' onto path 114 and/or onto phase shifting circuitry 74 while blocking relatively low frequency signals such as ground level voltage Vss from passing to phase shifting circuitry 74. Radio-frequency data signals D and power signals Vcc may be received from first device 12 over path 112. Filtering circuitry 214 may filter out radio-frequency data signals D and may pass power voltage Vcc to power terminal 124. Filtering circuitry 222 may filter out power voltage Vcc and may pass radio-frequency data signals D to phase shifting circuitry 74. Phase adjusted radio-frequency data signals D' and ground signals Vss may be received from first device 12 over path 114. Filtering circuitry 220 may filter out phase shifted data signals D' and may pass ground voltage Vss to terminal 120. Filtering circuitry 224 may filter out ground voltage Vss and may pass phase shifted radio-frequency data signals D' to phase shifting circuitry 74. In this way, second device 14 may extract the data signals from the ground and power signals received over shared conductive paths from device 12. Similarly, if desired, radio-frequency data signals D and power voltage Vcc may be conveyed to first device 14 over path 112 whereas phase shifted radio-frequency data signals D' and ground voltage Vss may be passed to first device 12 over path 114.

The example of FIG. 7 is merely illustrative and does not serve to limit the scope of the present invention. If desired, power voltage Vcc may be provided to phase shifted data signal line 114 via filtering circuitry 196 and 220 (e.g., terminals 122 and 124 may be coupled to nodes 206 and 216 respectively) whereas ground voltage Vss is provided to data signal line 112 via filtering circuitry 192 and 214 (e.g., terminals 118 and 120 may be coupled to nodes 204 and 210 respectively). In another suitable arrangement, interconnect 16 may include three conductive paths such that one of ground voltage Vss and power voltage Vcc may be frequency multiplexed onto one of paths 112 and 114 while the other of ground voltage Vss and power voltage Vcc are conveyed between devices 12 and 14 over a dedicated conductive line (e.g., one of paths 110 or 116 of FIG. 5). If desired, filtering circuits 200 and 202 may be omitted and coupling capacitor 106 may be used as a high pass filter that filters out low frequency ground and power signals from passing to transceiver circuitry 56 and/or filtering circuits 222 and 224 may be omitted and coupling capacitor 134 may be used as a high pass filter that filters out low frequency ground and power signals from passing to transceiver circuitry 72. If desired, coupling capacitors 106 and/or 134 may be omitted. In another suitable arrangement, first device 12 may transmit data D to second device 14 at multiple frequencies at once. For example, device 12 may transmit data D to second device 14 at 2.4 GHz and 5.5 GHz. In this scenario, first device 12 may transmit phase shifted data D' to second device 14 to be 180 degrees out of phase with each frequency of the data signals D conveyed to second device 14 (e.g., device may provide a first signal at 2.4 GHz and a second signal at 5.5 GHz to second device 14 over path 112 at a given time and may concurrently provide a third signal at 2.4 GHz that is 180 out of phase with the first signal on path 114 and a fourth signal at 5.5 GHz that is 180 out of phase with the second signal on path 114, etc.).

Figure 8:
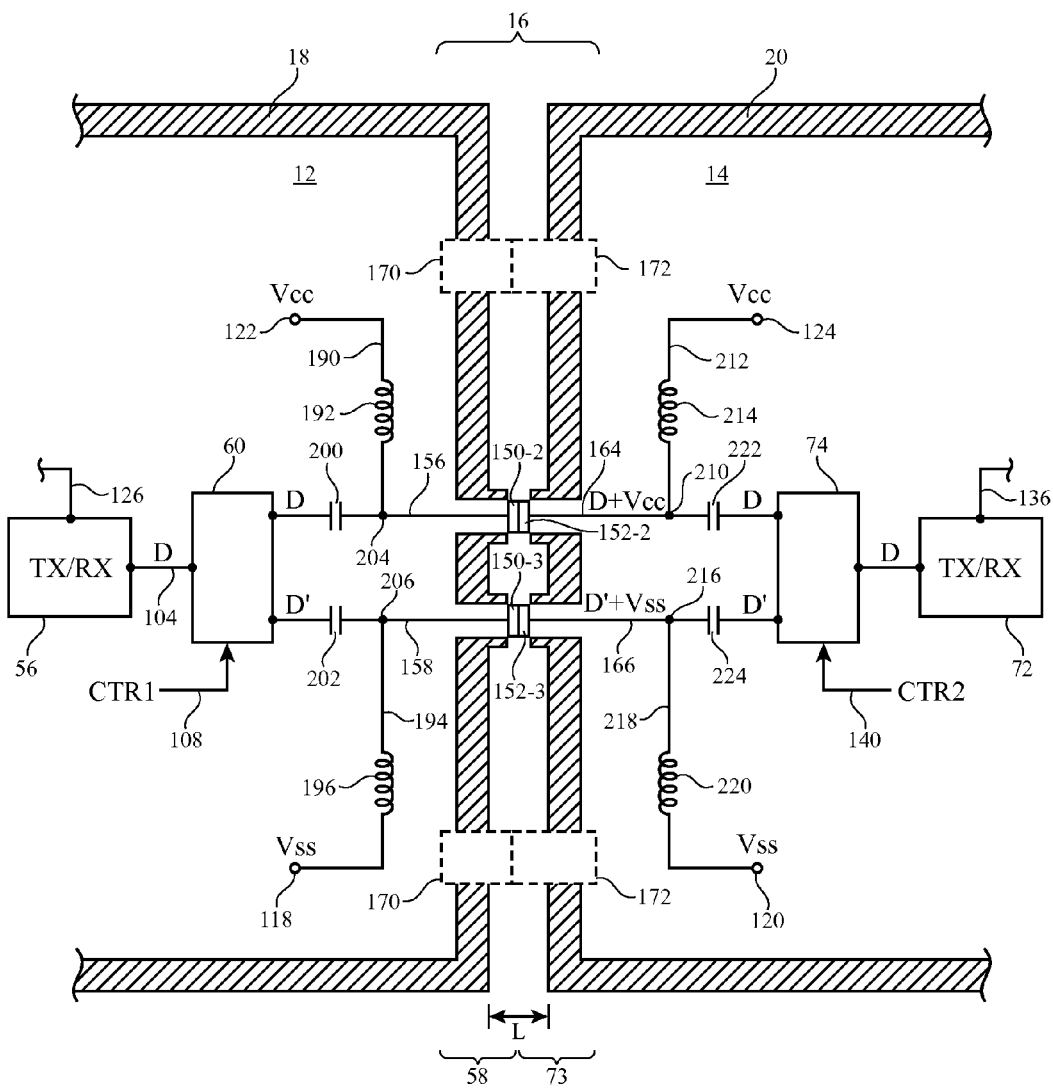
FIG. 8 is a diagram showing how illustrative radio-frequency connectors may be placed into electrical contact while multiplexing power and ground signals onto radio-frequency data lines in accordance with an embodiment.

FIG. 8 is an illustrative diagram showing how first connector structures 58 on first device 12 may interface with second connector structures 73 on second device 14 to form conductive path 16 when interconnect 16 is formed using only two paths for frequency multiplexing the data signals with ground and power signals. As shown in FIG. 8, connector structures 58 may be mounted to connector structures 73 to establish conductive contact between first electronic device 12 and second electronic device 14 for conveying radio-frequency signals between the devices. Connector structures 58 include two contact pads 150 that form a portion of the conductive paths of radio-frequency interconnect 16 (e.g., data contact 150-2 and phase shifted data contact 150-3). Contact pad 150-2 may be coupled to node 204 via conductive trace 156. Node 204 may be coupled to power supply terminal 122 via conductive trace 190. Contact pad 150-3 may be coupled to node 206 via conductive trace 158. Node 206 may be coupled to ground terminal 118 via conductive trace 194. Similarly, connector structures 73 include two contact pads 152 that form a portion of the conductive paths of radio-frequency interconnect 16 (e.g., data contact 152-2 and phase shifted data contact 152-3). Contact pad 152-2 may be coupled to node 210 via conductive trace 164. Node 210 may be coupled to power supply terminal 124 via conductive trace 212. Contact pad 152-3 may be coupled to node 216 via conductive trace 166. Node 216 may be coupled to ground terminal 120 via trace 218.

Conductive traces 190, 156, 158, and 194 may be formed on different substrates or on one or more common substrates (e.g., on one or more printed circuit boards or other dielectric substrates within device 12). In another suitable arrangement, one or more of traces 190, 156, 158, and 194 may be formed from conductive wires, connector structures, conductive vias structures, pogo pins, spring pins, solder structures, transmission line structures, or any other desired conductive structures within device 12 for electrically coupling contact pads 150 to phase shifting circuitry 60 and terminals 122 and 118.

Similarly, connector structures 73 on second device 14 may include two contact pads 152 that form a portion of the conductive paths of interconnect 16 (e.g., a data contact 152-2 and a phase-shifted data contact 152-3). Contact pad 152-2 may be coupled to node 210 via trace 164. Node 210 may be coupled to power supply terminal 124 via conductive trace 162. Contact pad 152-3 may be coupled to node 216 via trace 166. Node 216 may be coupled to ground terminal 120 via trace 218. Conductive traces 212, 164, 166, and 218 may be formed on different substrates or on one or more common substrates (e.g., on one or more printed circuit boards or other dielectric substrates within device 12). In another suitable arrangement, one or more of traces 212, 164, 166, and 218 may be formed from conductive wires, connector structures, conductive vias structures, pogo pins, spring pins, solder structures, transmission line structures, or any other desired conductive structures within device 14 for electrically coupling contact pads 152 to phase shifting circuitry 74 and terminals 124 and 120. Because the ground and power signals are frequency multiplexed onto signal contacts 150-2, 152-2, 150-3, and 152-3, connector 16 may be formed using only two conductive paths thereby reducing the total area required to form interconnect 16 relative to a four path interconnect as shown in the example of FIG. 4.

Figure 9:
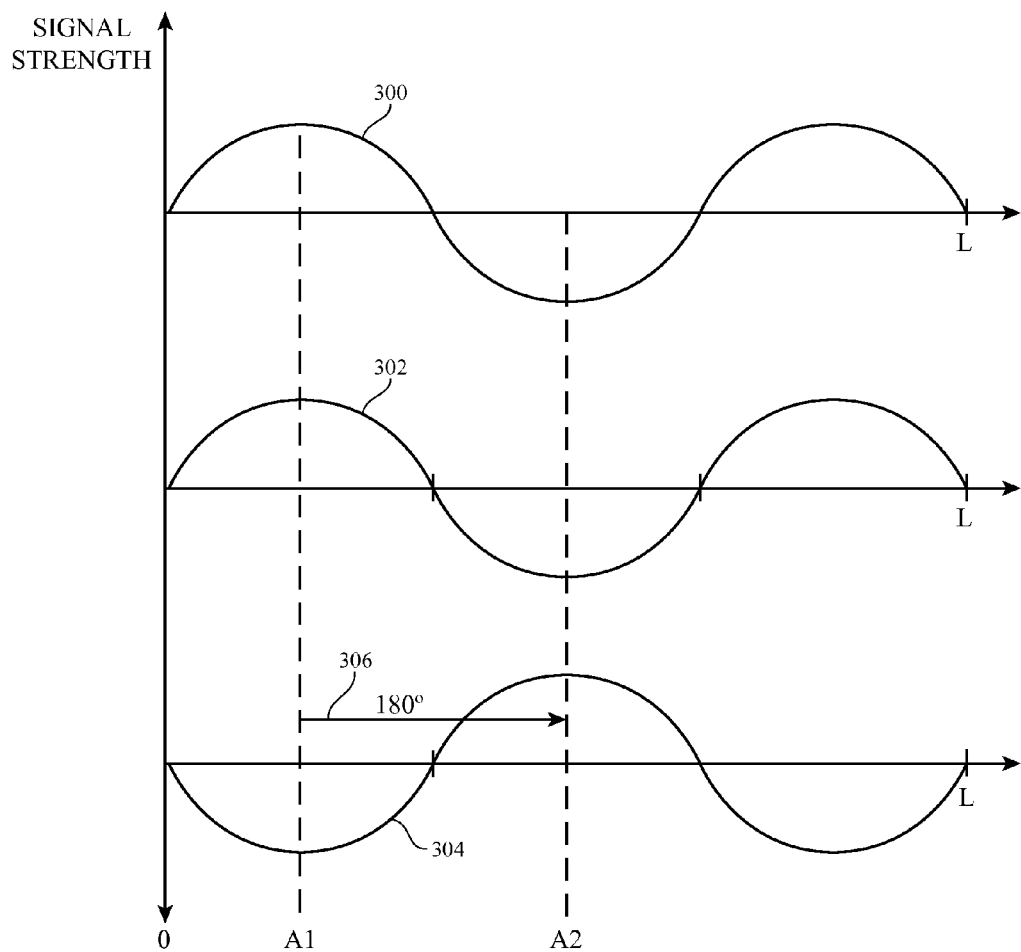
FIG. 9 is an illustrative plot showing how radio-frequency data signals may be phase shifted to cancel out the electromagnetic effects of corresponding un-shifted radio-frequency data in accordance with an embodiment.

FIG. 9 is an illustrative signal diagram showing how phase shifting circuitry 60 and/or 74 of devices 12 and 14 may generate phase shifted data signals D' that are approximately 180 degrees out of phase with a corresponding data signal D. The illustrative signal diagrams of FIG. 9 plot signal strength as a function of the lateral position between devices 12 and 14 while device 14 is connected to device 12 (e.g., at a position ranging between 0 and L). As shown in FIG. 9, curve 300 illustrates the signal strength of radio-frequency data signal D on path 112 between electronic devices 12 and 14. The signal waveform of data signal 300 may be, for example, a standing wave having a signal peak at location A1 between devices 12 and 14. This example is merely illustrative and, in general, radio-frequency signal D may have any desired signal pattern. For example, data signal 300 need not be a standing waveform, as the transceiver circuitry on both devices is likely to be well matched.

Curve 302 illustrates the signal strength of phase-shifted radio-frequency data signal D' when provided with a phase shift of zero degrees relative to the radio-frequency data signal D associated with curve 300. In other words, signal 302 may be generated by phase shifting circuitry 60 by merely passing a copy of data signal D onto path 114 without changing the phase of signal D' relative to signal D (e.g., modified signal D' associated with curve 302 may have peaks or maxima that overlap with the peaks of signal 300 such as a peak at position A1 that aligns with the peak at position A1 of data signal 300). When signal 300 is provided on line 112 concurrently with providing signal 302 on line 114, the electric field generated by signals 300 and 302 may constructively interfere, generating a resonance that undesirably radiates (leaks) electromagnetic energy at interconnect 16.

Curve 304 illustrates the signal strength of phase-shifted radio-frequency data signal D' when provided with a phase shift of 180° relative to data signal D associated with curve 300. In other words, signal 304 may be generated using phase circuitry 60 by shifting a copy of data signal D by 180° and passing the shifted signal D' onto path 114 (e.g., so that the minimum of signal 300 at location A1 is shifted to location A2 in shifted signal 304 as shown by arrow 306). In this way, signal 304 is 180° out of phase with data signal 300 (e.g., signal 304 may have troughs or minima such as the minimum at position A1 that overlap with the maxima of data signal 300 such as the maximum at position A1). When signal 304 is provided on line 114 concurrently with providing signal 300 on line 112, the electric field generated by signals 300 and 302 may destructively interfere, mitigating resonance and undesired radiation of electromagnetic energy at interconnect 16.

Figure 10:
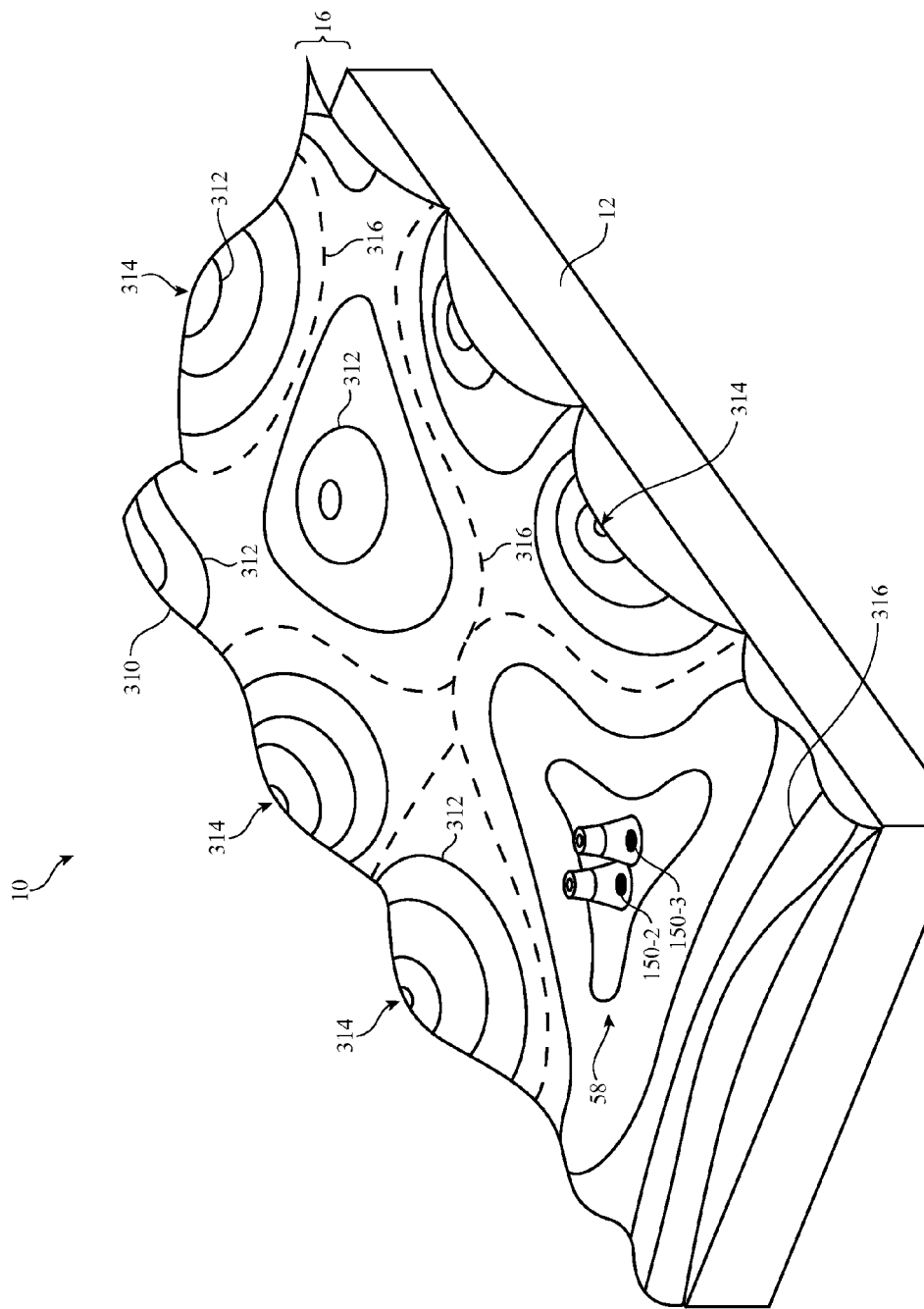
FIG. 10 is an illustrative diagram showing how electric field resonance and undesirable signal leakage may be present at an unshielded radio-frequency interconnect and the chassis of a corresponding external electronic device (e.g., in a volume between two devices) when phase shifted complementary radio-frequency data is not transmitted over the interconnect in accordance with an embodiment.

FIG. 10 is an illustrative diagram showing an example of the electric field generated between devices 12 and 14 while conveying radio-frequency data signals D on conductive path 112 without providing phase shifted data signals D' that are out of phase with signals D on second conductive path 114. As shown in FIG. 10, first device 12 has data contact pad 150-2 and phase shifted data contact pad 150-3 on a given surface of device 12 while device 12 is in conductive contact with second device 14 (second device 14 has been omitted from FIG. 10 for the sake of clarity). Surface 310 illustrates the electric field strength at the surface of device 12 (e.g., at interconnect 16) while transmitting data D over contact pad 150-2 and without transmitting phase-shifted modified data D' over contact pad 150-3 (or while transmitting modified data D' substantially in-phase with data D such as shown by curve 302 of FIG. 9). Contour lines 312 of surface 310 exhibit locations of constant electric field magnitude. Surface 310 exhibits a resonance as shown by well-defined field peaks (maxima) 314 and troughs (minima) 316. The electric field resonance shown by surface 310 may induce portions of device 12 and/or device 14 to radiate electromagnetic energy and/or may generate other undesirable electromagnetic interference effects in system 10. Similarly, resonance 310 may lead to undesired absorption of electromagnetic energy (e.g., noise) onto signal line 150-2 from the ambient surroundings. For example, for a given device size, resonance 310 may lead to radiation that has a strength as high as 72 dBµV/m at 5.5 GHz and at three meters away from system 10 when signals D are provided at a power level of −20 dBm, and/or may collect noise signals having a power level −17 dBm at signal port 150-2 (e.g., if 3 V/m of noise is present in the vicinity of system 10). The example of FIG. 10 is merely illustrative and, in general, any electromagnetic current distribution pattern may be induced at the surface of device 12 (e.g., at any given corresponding resonant frequency). If desired, device 12 may include additional ground and power contact pads (e.g., as described in connection with FIGS. 5 and 6).

Figure 11:
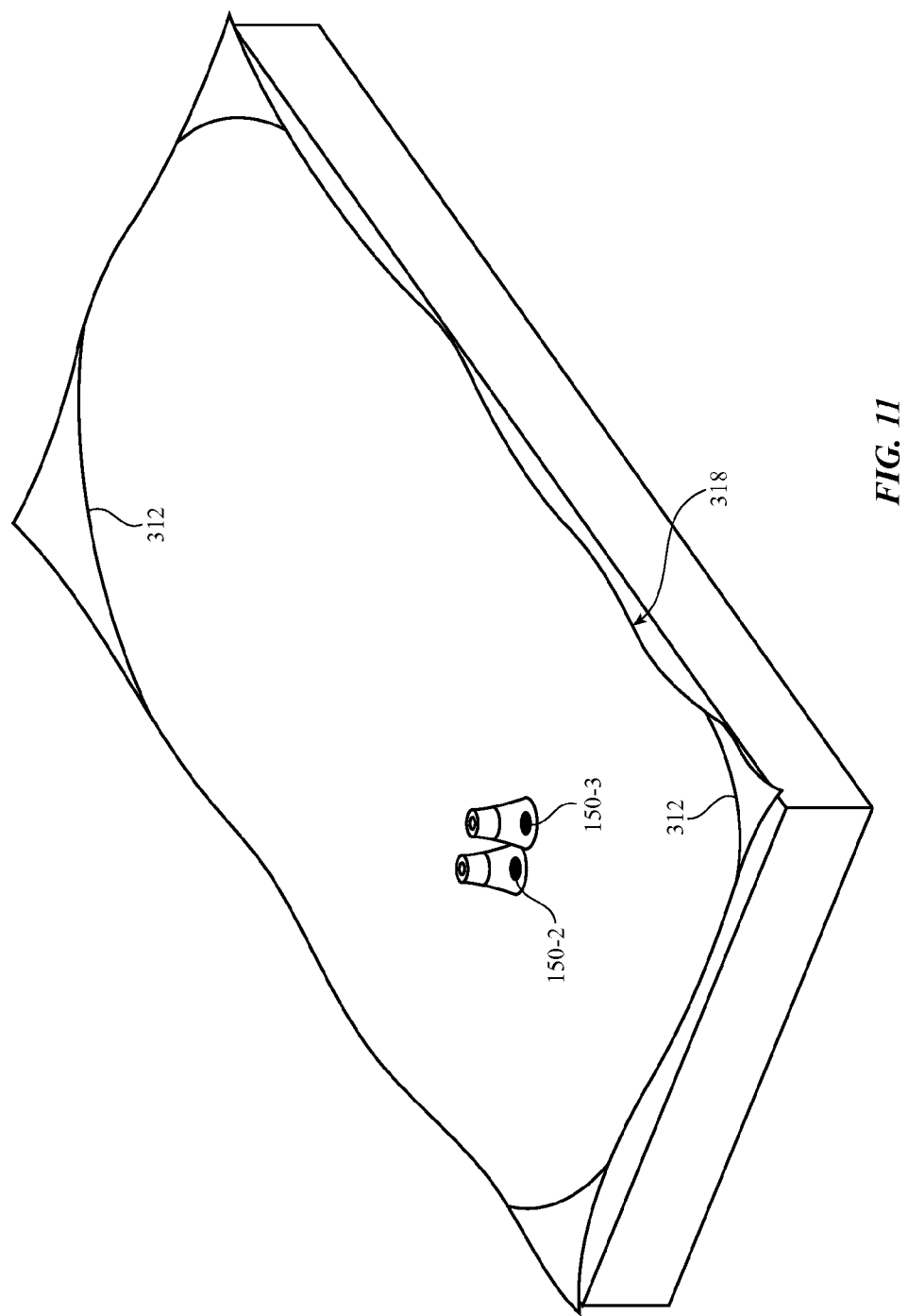
FIG. 11 is an illustrative diagram showing how electric field resonance and undesirable signal leakage may be effectively mitigated at an interconnect when phase shifted complementary radio-frequency data is transmitted over the interconnect in accordance with an embodiment.

FIG. 11 is an illustrative diagram showing an example of the electric field generated between devices 12 and 14 while conveying data D on conductive path 112 and while providing phase shifted data signals D' that are out of phase with signals D on second path 114. As shown in FIG. 11, surface 318 illustrates the electric field strength at interconnect 16 while transmitting data D over contact pad 150-2 and while providing phase-shifted modified data D' over contact pad 150-3 that is approximately 180° out of phase with data D (e.g., as shown by curve 304 of FIG. 9). Contour lines 312 of surface 310 exhibit locations of constant electric field magnitude. Surface 318 does not exhibit any well-defined maxima or minima (except for perhaps small perturbations in the vicinity of contacts 150). Field 318 thereby does not exhibit strong enough resonance to induce portions of devices 12 and 14 to radiate electromagnetic energy or to otherwise interfere with other device components or absorb ambient noise. For example, resonance 318 may lead to radiation that has a strength that is reduced by 41 dB and absorption of noise that is reduced by 41 dB relative to the scenario described in connection with FIG. 10. By providing signals D' at contact 150-3 that are approximately 180° out of phase with signals D, device 12 may mitigate resonance and radiation of electromagnetic energy in the vicinity of unshielded interconnect 16.

Figure 12:
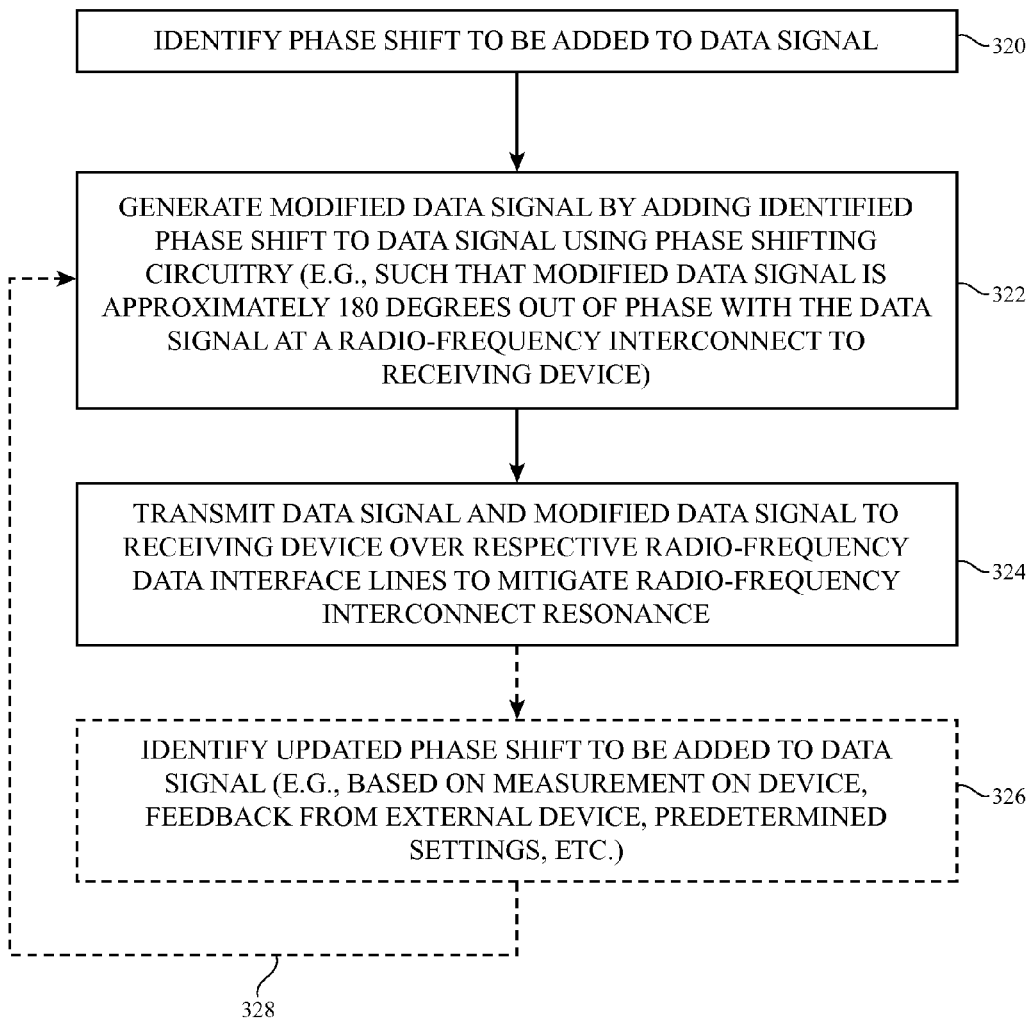
FIG. 12 is a flow chart of illustrative steps that may be performed by an electronic device of the type shown in FIGS. 1-11 for transmitting radio-frequency data and corresponding phase shifted data to an external electronic device over an unshielded radio-frequency interconnect in accordance with an embodiment.

FIG. 12 is a flow chart of illustrative steps that may be performed by first device 12 to convey radio-frequency data to second electronic device 14 while mitigating electromagnetic radiation in the vicinity of interconnect 16. The steps of FIG. 12 may, for example, be performed by first device 12 after second device 14 has been conductively connected to first device 12 (e.g., after second device 14 has been mounted to first device 12 such that contacts 152 on connector 73 are in electrical contact with contacts 150 on connector 58). The steps of FIG. 12 may, for example, be performed by first device 12 after identifying data D for transmission and after providing data D to phase shifting circuitry 60 (e.g., using transceiver circuitry 56).

At step 320, first device 12 may identify a phase shift to be added to data signals D to generate modified data signals D'. The phase shift to be provided may, for example, be hardcoded into phase shifting circuitry 60 or may be identified by control signal CTR1. The phase shift to be provided may be identified such that the modified data signals D' are approximately 180° out of phase with data signals D at the location of interconnect 58 (e.g., including any contributions from path length differences between traces 156 and 158).

At step 322, phase shifting circuitry 60 may pass the radio-frequency data signals D received from transceiver circuitry 56 to path 156 without modifying the phase of signals D. Phase shifting circuitry 60 may modify a copy of data D by performing the identified phase shift on a copy of data D to generate modified data D' (e.g., to generate modified data D' having a phase that is approximately 180° degrees out of phase with data D at the location of connector 58 accounting for any difference in path length of paths 156 and 158) and may provide modified data D' to path 158.

At step 324, first device 12 may transmit data signals D and modified data signals D' to second device 14 over contact pads 150-2 and 150-3. If desired, first device 12 may concurrently transmit ground signals Vss and power signals Vcc to second device 14 over paths 110 and 116 (e.g., as shown in FIG. 5) or over paths 112 and 114 (e.g., as shown in FIG. 7).

In some scenarios, external factors such as factors associated with the operation of second device 14 may perturb the relative phase shift of signals D and D' at interconnect 16. In order to ensure that modified signal D' remains approximately 180° out of phase with signal D, it may be desirable to be able to update the phase shift provided by circuitry 60. At optional step 326, device 12 may identify that the phase shift to be provided to the modified data signals D' needs to be changed. For example, first device 12 may identify that the phase shift needs to be updated based on information obtained at first device 12 (e.g., sensor information obtained by sensors 62 identifying a change in the phase of modified signal D' relative to signal D at interconnect 16), feedback from second device 14 (e.g., sensor information obtained by sensors 78 of second device 14), predetermined settings, etc. If first device 12 determines that the phase shift needs to be updated, first device 12 may identify the updated phase shift to apply and processing may loop back to path 322 as shown by 328 to generate modified data signals D' using the updated phase shift. For example, storage and processing circuitry 52 may control phase shift circuitry 60 to apply the updated phase shift using control signals CTR1.

If desired, second device 14 may monitor the relative phase of signals D and D' at interconnect 16 to determine whether modified signal D' is no longer suitably out of phase with signals D. If it is determined that modified signal D' is no longer suitably out of phase with signals D, second device 14 may inform first device 12 (e.g., over a wired link or a wireless link) that the phase shift needs to be updated and/or may identify the updated phase shift to apply. If desired, second device 14 and/or first device 12 may monitor interconnect 16 for the presence of electromagnetic radiation generated at interconnect 16 (e.g., indicative of modified signal D' no longer being out of phase with signal D) and may instruct phase shift circuitry 60 to update the phase shift used to generate modified data signals D' accordingly. In this way, system 10 may ensure that signals D' are 180° out of phase with respect to signals D for a wide variety of operating conditions, thereby mitigating electromagnetic energy leakage at interface 16.

The foregoing is merely illustrative and various modifications can be made by those skilled in the art without departing from the scope and spirit of the described embodiments. The foregoing embodiments may be implemented individually or in any combination.

What is claimed is:

1. An electronic device that communicates with an external electronic device, the electronic device comprising:
    a transmitter that transmits radio-frequency data;
    a connector having first and second conductive contacts; and
    phase shifting circuitry having a first terminal that receives the radio-frequency data from the transmitter, a second terminal coupled to the first conductive contact, and a third terminal coupled to the second conductive contact, wherein the phase shifting circuitry is configured to pass the radio-frequency data from the first terminal to the external electronic device over the second terminal and the first conductive contact, the phase shifting circuitry is configured to generate modified radio-frequency by applying a phase shift to the radio-frequency data received over the first terminal, and the phase shifting circuitry is configured to convey the modified radio-frequency data to the external electronic device over the third terminal and the second conductive contact while the first and second conductive contacts are in electrical contact with the external electronic device.

2. The electronic device defined in claim 1, wherein the phase shifting circuitry is configured to generate the modified radio-frequency data by applying a phase shift of 180 degrees to the radio-frequency data.

3. The electronic device defined in claim 1, wherein the external electronic device has a mating connector that mates with the connector and the connector further comprises a third conductive contact that conveys power signals to the external device when the mating connector is coupled to the connector.

4. The electronic device defined in claim 1, wherein the external electronic device has a mating connector that mates with the connector and the connector further comprises a third conductive contact that conveys ground signals to the external device when the mating connector is coupled to the connector.

5. The electronic device defined in claim 4, wherein the connector further comprises a fourth conductive contact that conveys power signals to the external electronic device when the mating connector is coupled to the connector.

6. The electronic device defined in claim 1, wherein the phase shifting circuitry comprises a circuit selected from the group consisting of: a balun circuit, a directional coupler circuit, an active amplifier circuit, an inverter circuit, and a power divider circuit.

7. The electronic device defined in claim 1, further comprising:
storage and processing circuitry, wherein the storage and processing circuitry is configured to provide control signals to the phase shifting circuitry that instruct the phase shifting circuitry to adjust the phase shift applied to the radio-frequency data when generating the modified radio-frequency data.

8. The electronic device defined in claim 1, wherein the external electronic device comprises a mating connector having first and second mating connector contacts, the electronic device further comprising:
a metal housing for the electronic device; and
connector alignment structures mounted to the metal housing that align the first conductive contact with the first mating connector contact and that align the second conductive contact with the second mating connector contact.

9. The electronic device defined in claim 1, further comprising:
a power source; and
a low pass filter circuit coupled between the power source and the first conductive contact.

10. The electronic device defined in claim 9, further comprising:
a ground terminal; and
an additional low pass filter circuit coupled between the ground terminal and the second conductive contact.

11. The electronic device defined in claim 10, further comprising:
a high pass filter circuit coupled between the phase shifting circuitry and the first conductive contact structure.

12. A method of operating an electronic device that communicates with an external electronic device, wherein the electronic device comprises conductive contacts, transceiver circuitry, and phase shifting circuitry, the method comprising:
with the transceiver circuitry, providing radio-frequency data signals to the phase shifting circuitry;
with the phase shifting circuitry, generating phase shifted data signals that are out of phase with respect to the radio-frequency data signals;
with the phase shifting circuitry, concurrently conveying the radio-frequency data signals and the phase shifted data signals to the conductive contacts; and
with the conductive contacts, conductively conveying the radio-frequency data signals and the phase shifted data signals to mating conductive contacts on the external electronic device.

13. The method defined in claim 12, wherein generating the phase shifted data signals comprises performing a phase shift of between 170 degrees and 190 degrees to the radio-frequency data signals.

14. The method defined in claim 13, further comprising:
with control circuitry on the electronic device, identifying an updated phase shift; and
with the phase shifting circuitry, generating the phase shifted data signals by applying the identified updated phase shift to the radio-frequency data signals.

15. The method defined in claim 12, further comprising:
with the phase shifting circuitry, receiving additional radio-frequency data signals and additional phase shifted data signals from the external electronic device over the conductive contacts; and
with the phase shifting circuitry, passing the additional radio-frequency data signals to the transceiver circuitry without performing any phase shift operations on the additional radio-frequency data signals.

16. The method defined in claim 12, wherein the conductive contacts comprise first and second conductive contacts, wherein the mating conductive contacts on the external electronic device comprise first and second mating contacts, and wherein conveying the radio-frequency data signals and the phase-shifted radio-frequency signals to the conductive contacts comprises:
passing the radio-frequency data signals to the first mating contact through the first conductive contact without performing any phase shift operations on the radio-frequency data signals; and
conveying the phase-shifted radio-frequency data signals to the second mating contact through the second conductive contact.

17. The method defined in claim 16, wherein generating the phase-shifted radio-frequency signals comprises:
applying a selected phase shift to the radio-frequency data signals so that the phase shifted radio-frequency data signals at the second conductive contact are between 170 degrees and 190 degrees out of phase with respect to the radio-frequency data signals at the first conductive contact.

18. An electronic device comprising:
a connector having first and second conductive contacts that mate with respective first and second mating contacts on an external electronic device;
transmitter circuitry that transmits radio-frequency signals to the first mating contact on the external electronic device via the first conductive contact;
radiation mitigation circuitry that receives the radio-frequency signals, applies a first phase shift to the radio-frequency signals to generate modified radio-frequency signals, and transmits the modified radio-frequency signals to the second mating contact on the external electronic device via the second conductive contact to mitigate radiation of electromagnetic energy at the connector; and
control circuitry that provides a control signal to the radiation mitigation circuitry that controls the radiation mitigation circuitry to apply a second phase shift that is different from the first phase shift to the radio-frequency signals.

19. The electronic device defined in claim 18, wherein the first phase shift applied to the radio-frequency signals to generate the modified radio-frequency signals is between 170 and 190 degrees.

20. The electronic device defined in claim 18, wherein the radio-frequency signals are transmitted over the first conductive contact while the modified radio-frequency data is concurrently transmitted over the second conductive contact, and the radio-frequency signals at the first conductive contact are between 170 and 190 degrees out of phase with respect to the modified radio-frequency signals at the second conductive contact.

* * * * *